United States Patent [19]
Wakimoto

[11] Patent Number: 5,935,236
[45] Date of Patent: Aug. 10, 1999

[54] MICROCOMPUTER CAPABLE OF OUTPUTTING PULSES

[75] Inventor: Akihiko Wakimoto, Tokyo, Japan

[73] Assignee: Mitsubishi Denki Kabushiki Kaisha, Tokyo, Japan

[21] Appl. No.: 08/974,821

[22] Filed: Nov. 20, 1997

[30] Foreign Application Priority Data

Aug. 8, 1997 [JP] Japan ..................... 9-215229

[51] Int. Cl.⁶ .................................................. G06F 9/302
[52] U.S. Cl. .................................................. 712/40; 712/39
[58] Field of Search ..................... 712/221, 40, 39; 395/562, 733, 806.4

[56] References Cited

U.S. PATENT DOCUMENTS

| | | | |
|---|---|---|---|
| 5,696,954 | 12/1997 | Guttag | 395/562 |
| 5,768,575 | 6/1998 | McFarland | 395/569 |

FOREIGN PATENT DOCUMENTS

| | | |
|---|---|---|
| 64/72616 | 3/1989 | Japan . |
| 4/178701 | 6/1992 | Japan . |
| 6/83985 | 3/1994 | Japan . |

*Primary Examiner*—Eric Coleman
*Attorney, Agent, or Firm*—Burns, Doane, Swecker & Mathis, LLP

[57] ABSTRACT

A microcomputer capable of outputting pulses in which an arithmetic processing unit outputs pulse control data according to the receiving of a trigger signal transferred from a trigger circuit, a data latch circuit latches each kind of pulse control data to be used for controlling output operation of the control register that stores the pulse control data, the data latch circuit outputs a pulse control signal, a NAND circuit performs a logical arithmetic operation between the output from the pulse generation circuit and the pulse control signal from the data latch circuit, so that a desired pulse or a pulse train is output in real time.

20 Claims, 17 Drawing Sheets

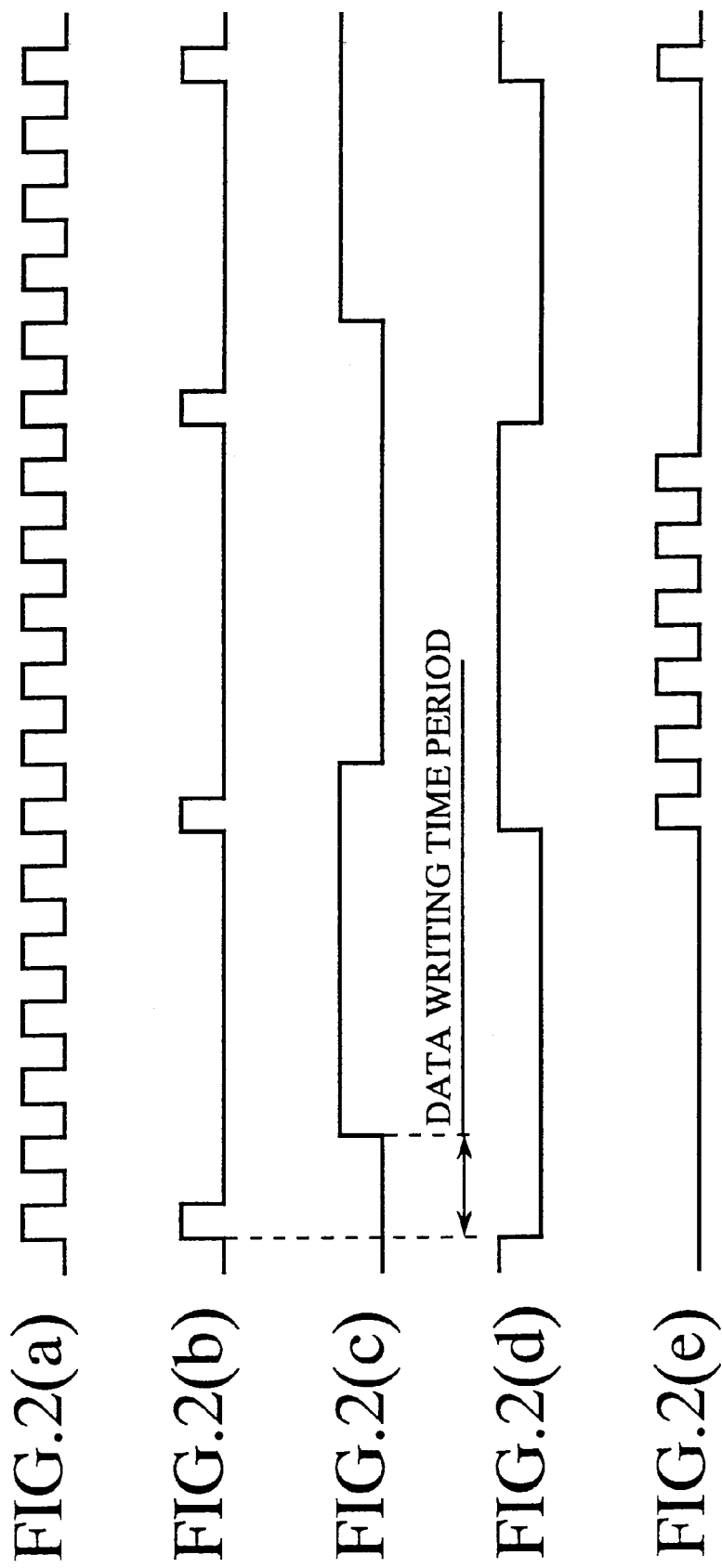

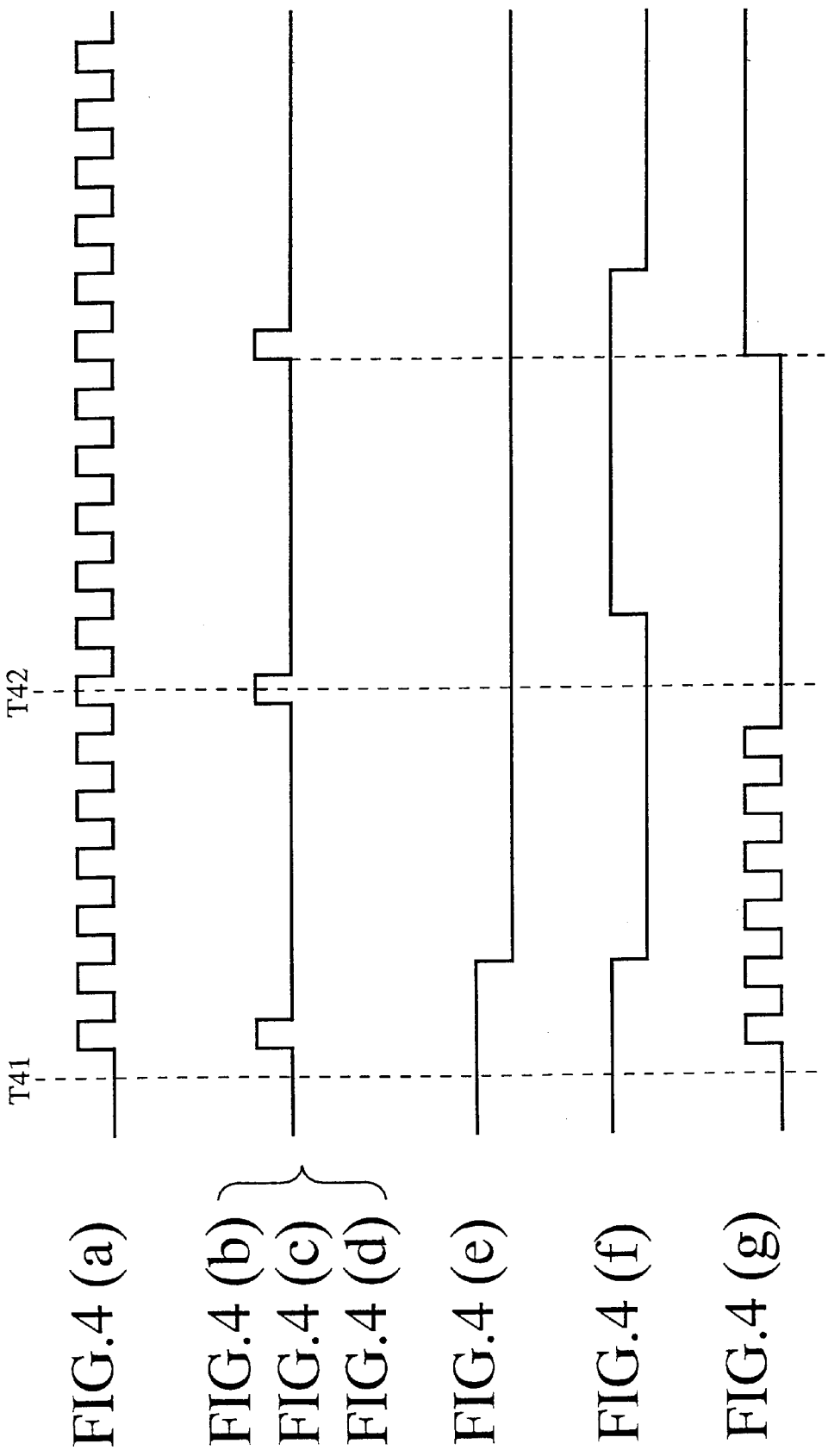

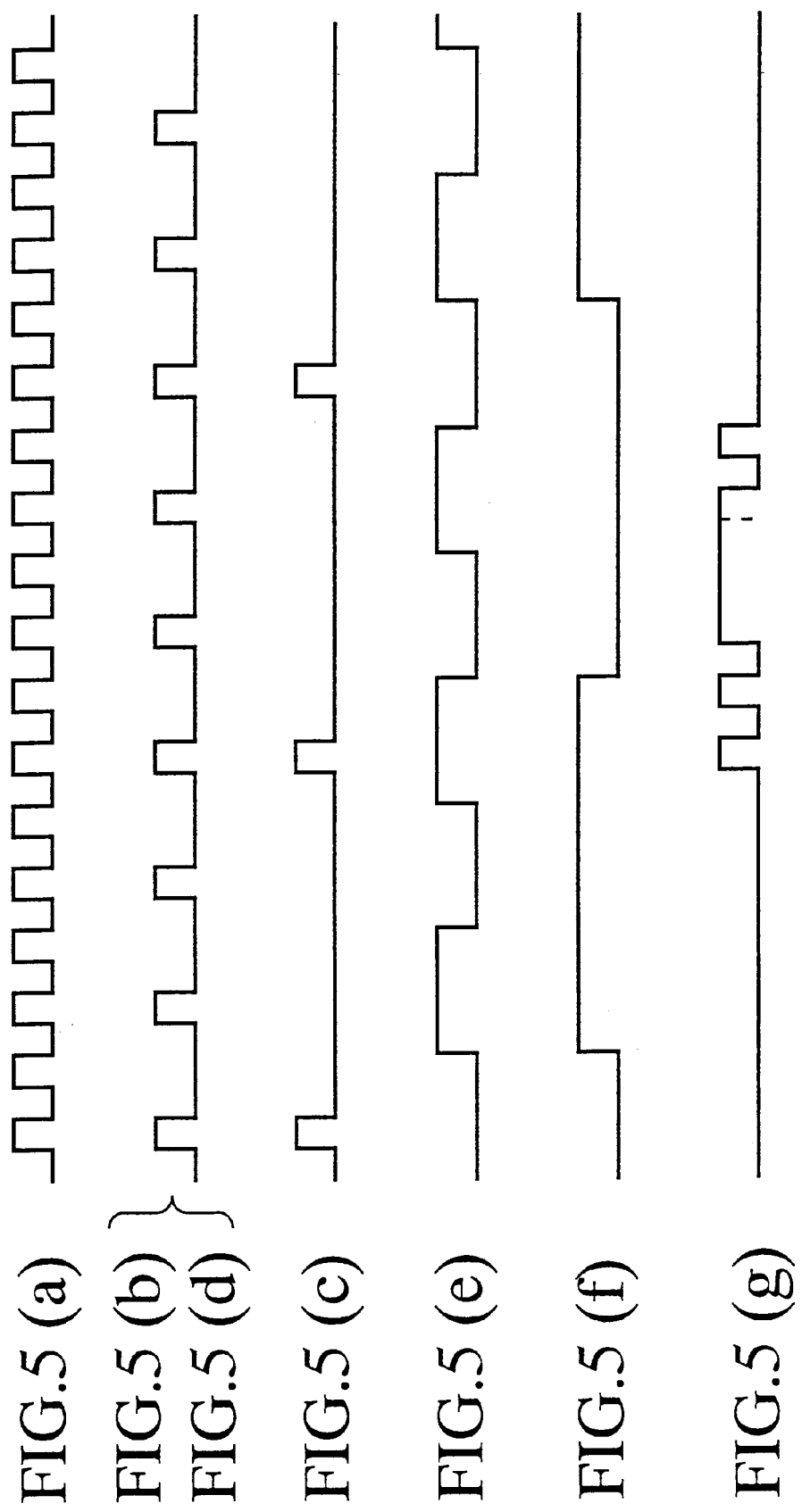

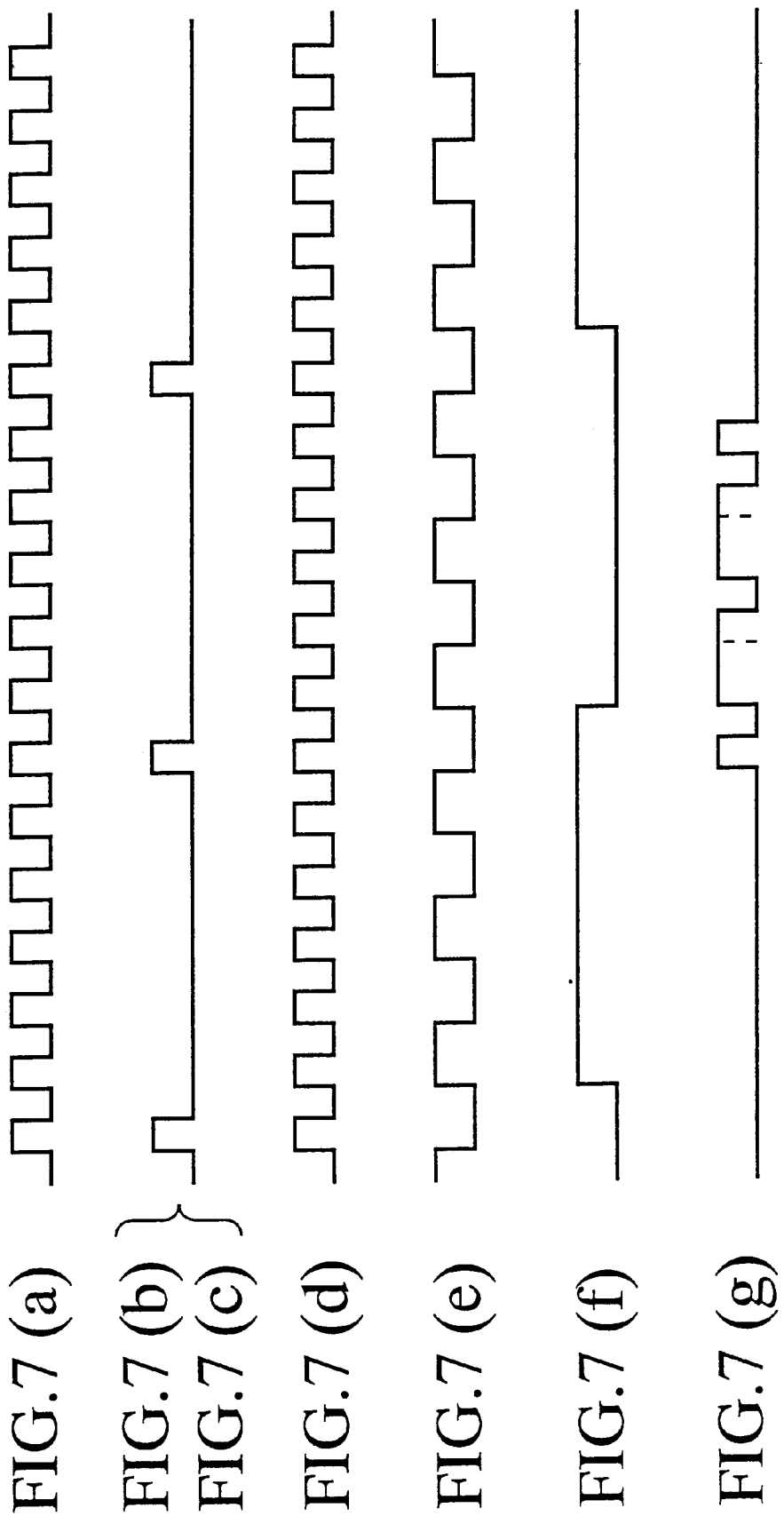

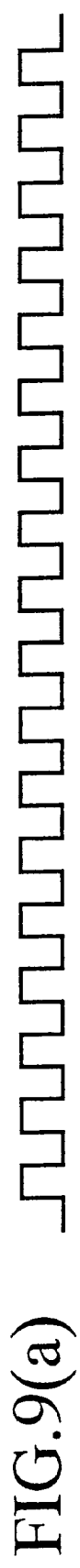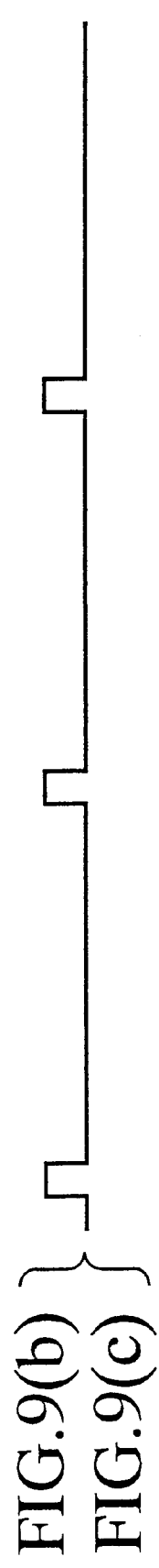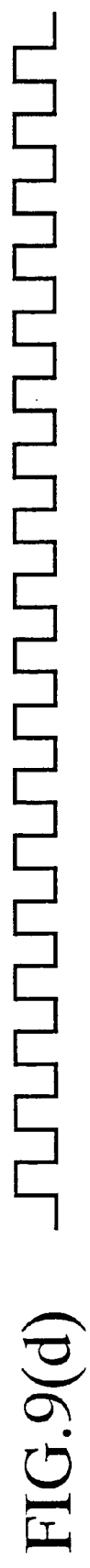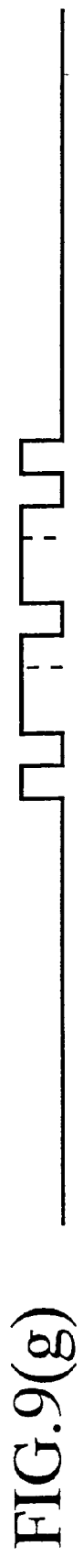
FIG.9(a) FIG.9(b) FIG.9(c) FIG.9(d) FIG.9(f) FIG.9(g)

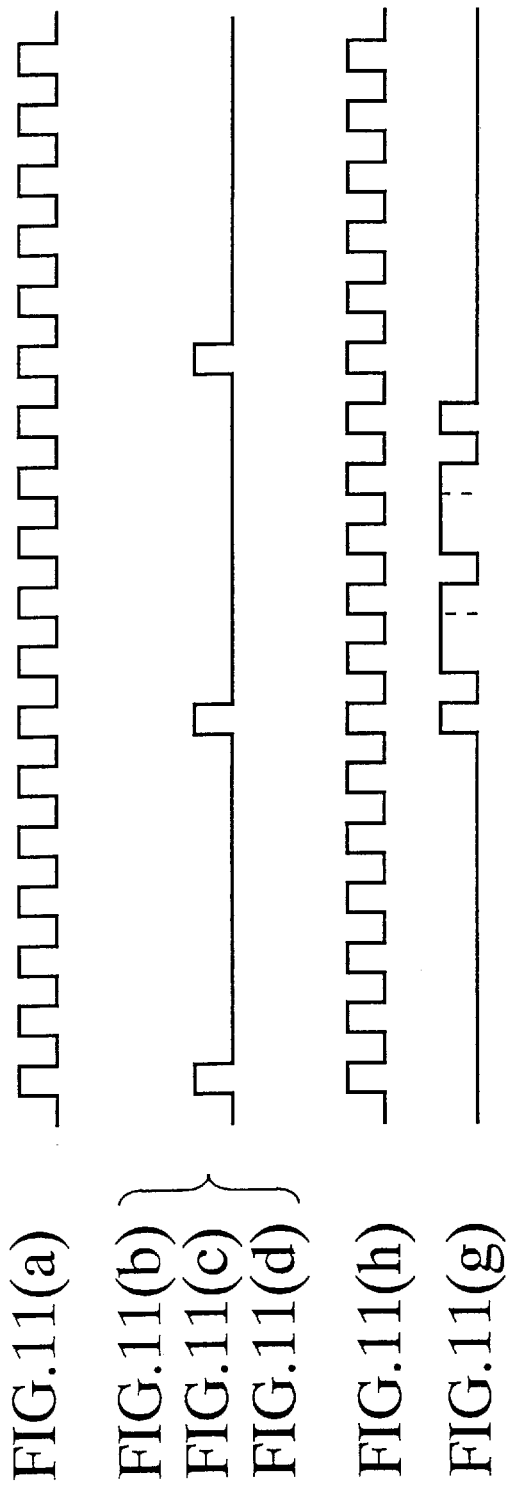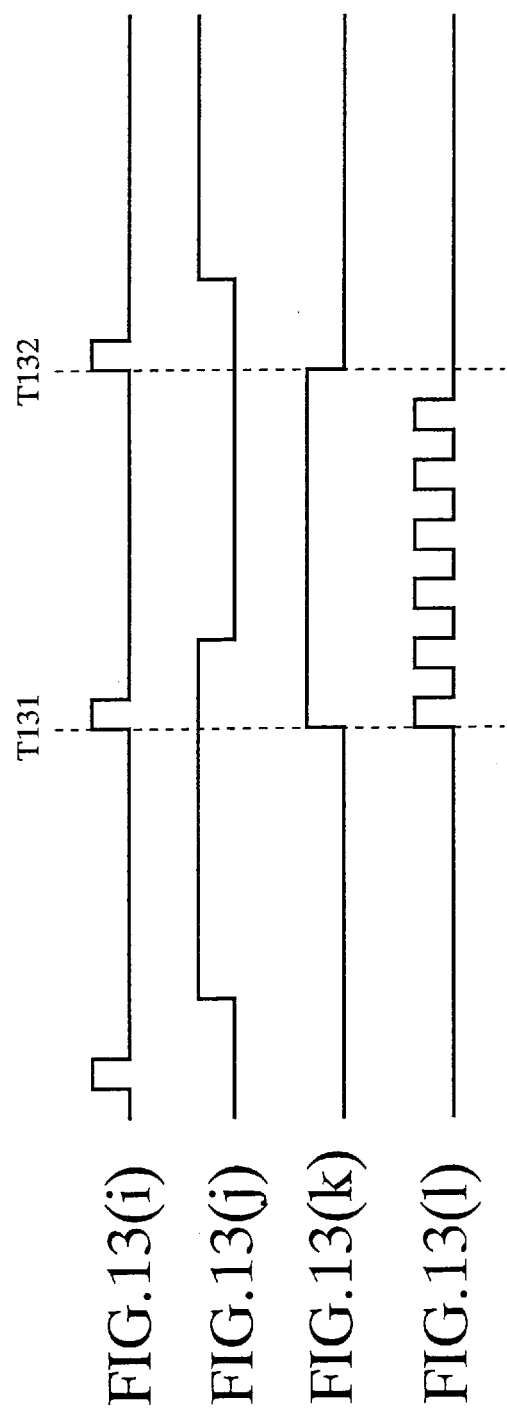

FIG.19
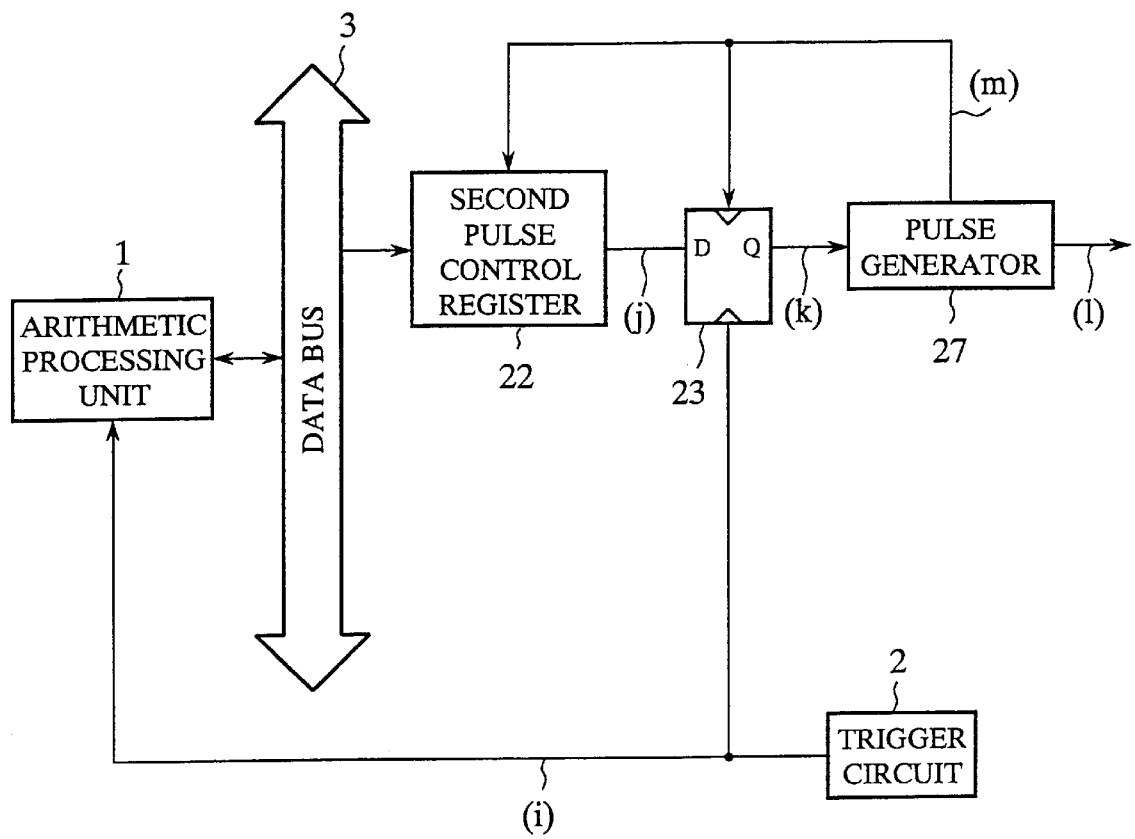
FIG.20(i)
FIG.20(m)
FIG.20(l)

MICROCOMPUTER CAPABLE OF OUTPUTTING PULSES

BACKGROUND OF THE INVENTION

1. Field of the Invention

The present invention relates to a microcomputer capable of outputting pulses, and, more particularly, to a microcomputer capable of executing interrupt processes corresponding to interrupt signals by halting the execution of predetermined processes currently executed when an arithmetic processing unit incorporated in the microcomputer receives trigger signals for the interrupt signals.

2. Description of the Prior Art

FIG. 24 is a block diagram showing a configuration of a conventional microcomputer with a function to output pulses. In FIG. 24, the reference number 100 designates an arithmetic processing unit for executing predetermined various kinds of processes and interrupt processes according to an interrupt signal when receiving a trigger signal corresponding to this interrupt signal used for the interrupt process. The reference number 200 denotes a trigger circuit for generating and outputting the trigger signal to the arithmetic processing unit 100 and other sections. The reference number 300 indicates a group of data buses (hereinafter referred to only as the data bus) for data input/output among the arithmetic processing unit 100 and other devices, 400 designates a pulse width control register for receiving pulse width data transmitted from the arithmetic processing unit 100, for storing these data items, and for generating and outputting pulse width control signals corresponding to the received pulse width control data. The reference number 500 denotes a pulse switching control register for receiving and storing pulse switching data transmitted from the arithmetic processing unit 100, and for generating and outputting pulse switching signals corresponding to the received pulse switching data. The reference number 600 indicates a pulse output period control register for receiving and storing pulse output period data transmitted from the arithmetic processing unit 100, and for generating and outputting pulse output period signals corresponding to the received pulse output period data. The reference number 700 designates a data latch circuit for sampling the pulse output period signals based on the trigger signal outputted to the arithmetic processing unit 100 and for outputting a pulse output period synchronous signal. The reference number 800 denotes a pulse generation circuit (pulse generator) for continuously outputting pulses having a pulse width corresponding to the pulse width control signals transmitted from the pulse width control register 400. The reference number 900 designates an inverter for inverting the electrical level of the pulses output from the pulse generator 800, and 1000 denotes a NAND circuit for receiving both the inverted pulses and pulse switching signal transferred from the pulse switching control register 500, for performing inverted AND operation (or inverted logical sum operation) between them, and for outputting the result of the inverted AND operation as a first logical arithmetic signal. The reference number 1100 indicates an AND circuit for receiving the first logical arithmetic signal and the pulse output period synchronous signal and for performing logical AND operation (or logical sum operation) between them and for outputting the result of the logical arithmetic operation as a second logical arithmetic signal.

Next, a description will now be given of the operation of the conventional microcomputer capable of outputting pulses.

Firstly, the trigger circuit 200 generates and transfers a trigger signal to the arithmetic operation unit 100. When receiving the trigger signal, the arithmetic operation unit 100 halts the operation of current processes and then executes an interrupt process corresponding to the trigger signal as an interrupt signal. In the interrupt operation, the arithmetic operation unit 100 transfers various data items to the pulse width control register 400, the pulse switching control register 500, and the pulse output period register 600. Then, those registers 400, 500, and 600 store the data items transferred from the arithmetic operation unit 100. Then, the pulse generator 800 generates and outputs pulses having a constant pulse width according to the pulse width control signal from the pulse width control register 400. Those output signals as the pulses from the pulse generator 800 are transferred to the NAND circuit 1000 through the inverter 900. The NAND circuit 1000 outputs the first logical arithmetic signals having a waveform in which the pulses from the inverter 900 are subtracted per predetermined period. In addition to this, the AND circuit 1100 outputs the second logical arithmetic signals having a waveform in which the first logical arithmetic signals are subtracted per pulse output period synchronous signal that is synchronized with the latch signal from the data latch circuit 700. Those second logical arithmetic signals are provided to outside devices as output pulses of the microcomputer. Specifically, the trigger circuit 200 incorporates an internal timer (omitted from FIG. 24), the trigger circuit 200 generates and outputs the trigger signals according to output of the internal timer. For example, it is also acceptable in configuration to incorporate an input terminal through which external signals are inputted in the microcomputer. In this configuration, the trigger circuit 200 generates and outputs the trigger signals based on the receiving of external signals supplied through the input terminal.

Because the conventional microcomputer capable of outputting pulses has the above configuration, it is difficult to execute real time operation even if it is required to output pulses from the microcomputer in real time, namely it is difficult to switch the output pulse immediately, according to the receiving of the trigger signal transferred from the trigger circuit 200. Therefore, as a matter of course, it is required to generate and transfer the trigger signals to the arithmetic processing unit 100 by the trigger circuit 200 without any delaying of normal operations of the microcomputer. Accordingly, it is difficult to switch the output pulses at a high sped rate in the conventional microcomputer because the conventional microcomputer has the above configuration in which the output pulses are switched by the data replace operation described above. In addition, it is not possible to specify a timing of switching of the output pulses based on the data replace operations and it is also difficult to output a pulse train having a same pattern continuously based on a same control operation.

Furthermore, even if the interrupt process for outputting pulses occupies the operation of the arithmetic processing unit 100, or even if the priority level of the interrupt operation caused by the trigger circuit 200 is increased in order to eliminate the drawbacks described above, it is difficult to perform the pulse output operation in the microprocessor in real time by switching or changing the output pulses per very short time period, because a delay time from the time after the trigger circuit 200 outputs the trigger signal to the time of data switching or to the timing of switching of the output pulses is very long.

As described above, there is the drawback that it is difficult to change output pulses from the microcomputer in real time, namely immediately, according to switching of trigger signals without increasing of load of the arithmetic processing unit 100.

SUMMARY OF THE INVENTION

Accordingly, an object of the present invention is, with due consideration to the drawbacks of the conventional microcomputer having a function to output pulses, to provide a microcomputer capable of outputting pulses in which output pulses can be changed or switched in real time, namely immediately, according to the receiving of trigger signals without any increasing of a load of the arithmetic operation unit incorporated in the microcomputer.

In accordance with a preferred embodiment of the present invention, a microcomputer capable of outputting pulses, comprises an arithmetic processing unit for halts a current process and for executing an interrupt process corresponding to receiving of a trigger signal indicating the interrupt process when said arithmetic processing unit receives the trigger signal for the interrupt process during the execution of the current process, a trigger circuit for generating the trigger signal and for outputting the trigger signal to said arithmetic processing unit and other devices, a first output control circuit for receiving and storing first pulse control data transferred from the said arithmetic processing unit according to the receiving of the trigger signal, and for outputting a first pulse control signal corresponding to the first pulse control data, a pulse generator for generating and for outputting a pulse train, and a first two-input logical circuit for inputting the pulse train and the first pulse control signal, and for performing a logical arithmetic operation between them and for outputting a result of the logical arithmetic operation as a first logical arithmetic signal. In the microprocessor, said first output control circuit switches the first pulse control signal to other first pulse control signal according to the receiving of the trigger signal transferred from the trigger signal. Said microcomputer outputs the first logical arithmetic signal as output pulses.

In accordance with a preferred embodiment of the present invention, a microcomputer capable of outputting pulses, comprises an arithmetic processing unit for halts a current process and for executing an interrupt process corresponding to receiving of a trigger signal indicating the interrupt process when said arithmetic processing unit receives the trigger signal for the interrupt process during the execution of the current process, a trigger circuit for generating the trigger signal and for outputting the trigger signal to said arithmetic processing unit and other devices, a second output control circuit for receiving and storing second pulse control data transferred from the said arithmetic processing unit according to the receiving of the trigger signal, and for outputting a second pulse control signal corresponding to the second pulse control data, and a pulse generator for generating and for outputting a pulse train corresponding to the second pulse control signal. In the microcomputer, said second output control circuit switches the second pulse control signal to other second pulse control signal according to the receiving of the trigger signal transferred from the trigger signal. Said microcomputer outputs the pulse train as output pulses.

The microcomputer as another preferred embodiment of the present invention, further comprises a second output control circuit for receiving and storing second pulse control data transferred from the said arithmetic processing unit according to the receiving of the trigger signal transferred from said trigger circuit, and for outputting a second pulse control signal corresponding to the second pulse control data and for switching the second pulse control signal to other second pulse control signal according to the receiving of the trigger signal transferred from said trigger circuit. In the microcomputer, said pulse generator outputs the pulse train corresponding to the second pulse-control signal.

The microcomputer as another preferred embodiment of the present invention, further comprises a third output control circuit for receiving and storing third pulse control data transferred from the said arithmetic processing unit according to the receiving of the trigger signal transferred from said trigger circuit, and for outputting a third pulse control signal corresponding to the third pulse control data and for switching the second pulse control signal to other second pulse control signal according to the receiving of the trigger signal transferred from said trigger circuit, and a second two-input logical circuit for inputting the first logical arithmetic signal and the third pulse control signal, and for performing a logical arithmetic operation between them and for outputting a result of the logical arithmetic operation as a second logical arithmetic signal. The microcomputer outputs the second logical arithmetic signal as the output pulses.

In the microcomputer capable of outputting pulses as another preferred embodiment of the present invention, said fist two-input logical circuit comprises an inverter circuit for inverting the pulse train and an NAND circuit for inputting the output from said inverter circuit and the first pulse control signal, and wherein said second two-input logical circuit comprises an AND circuit.

In the microcomputer capable of outputting pulses as another preferred embodiment of the present invention, at least one of said first output control circuit, said second output control circuit, and said third output control circuit outputs the pulse control signal to other pulse control signal in a constant pattern corresponding to the receiving of the trigger signal instead of receiving and storing the pulse control data transferred from said arithmetic processing unit.

In the microcomputer capable of outputting pulses as another preferred embodiment of the present invention, said trigger circuit outputs the trigger pulses to at least one of said first output control circuit, said second pulse control circuit, and said third output control circuit, and the number of the trigger pulses is greater by at least one than the trigger pulses that are transferred to others.

In the microcomputer capable of outputting pulses as another preferred embodiment of the present invention, said pulse generation circuit outputs an overflow signal every outputting of the pulse, and at least one of said first output control circuit, said second pulse control circuit, and said third output control circuit comprises a plurality of registers for storing the pulse control signals and for sequentially switching the pulse control signal corresponding to the pulse control data when receiving the overflow signal as the trigger signal.

In the microcomputer capable of outputting pulses as another preferred embodiment of the present invention, said pulse generation circuit outputs an overflow signal every outputting of the pulse, and at least one of said first output control circuit, said second pulse control circuit, and said third output control circuit counts down or counts up the pulse control data in order to sequentially switch the pulse control signal corresponding to the pulse control data when receiving the overflow signal as the trigger signal.

BRIEF DESCRIPTION OF THE DRAWINGS

These and other objects, features, aspects and advantages of the present invention will become more apparent from the following detailed description of the present invention when taken in conjunction with the accompanying drawings, in which:

FIGS. 2a2b, 2c, 2d and 2e are a timing chart showing the operation of the microcomputer capable of outputting pulses shown in FIG. 1;

FIGS. 4a–4g is a timing chart showing the operation of the microcomputer capable of outputting pulses shown in FIG. 3;

FIGS. 5a–5g is a timing chart showing the operation of the microcomputer capable of outputting pulses as a third embodiment of the present invention;

FIGS. 7a–7g is a timing chart showing the operation of the microcomputer capable of outputting pulses shown in FIG. 6;

FIGS. 9a–9d and 9f, 9g are a timing chart showing the operation of the microcomputer capable of outputting pulses shown in FIG. 8;

FIGS. 11a–11d and 11h and 11g are a timing chart showing the operation of the microcomputer capable of outputting pulses shown in FIG. 10;

FIG. 13a–13l are a timing chart showing the operation of the microcomputer capable of outputting pulses shown in FIG. 12;

FIGS. 15l and 15m–15q are a timing chart showing the operation of the microcomputer capable of outputting pulses shown in FIG.14;

FIG. 18i and 18l are a timing chart showing the operation of the microcomputer capable of outputting pulses shown in FIG. 17;

FIG. 19 is a block diagram showing a configuration of a microcomputer capable of outputting pulses as an eleventh embodiment of the present invention;

FIGS. 20i and 20l and 20m are a timing chart showing the operation of the microcomputer capable of outputting pulses shown in FIG. 19;

DESCRIPTION OF THE PREFERRED EMBODIMENTS

Other features of this invention will become apparent through the following description of preferred embodiments which are given for illustration of the invention and are not intended to be limiting thereof.

Preferred embodiments of a microcomputer capable of outputting pulses according to the present invention will now be described with reference to the drawings.

First Embodiment

Figure 1:
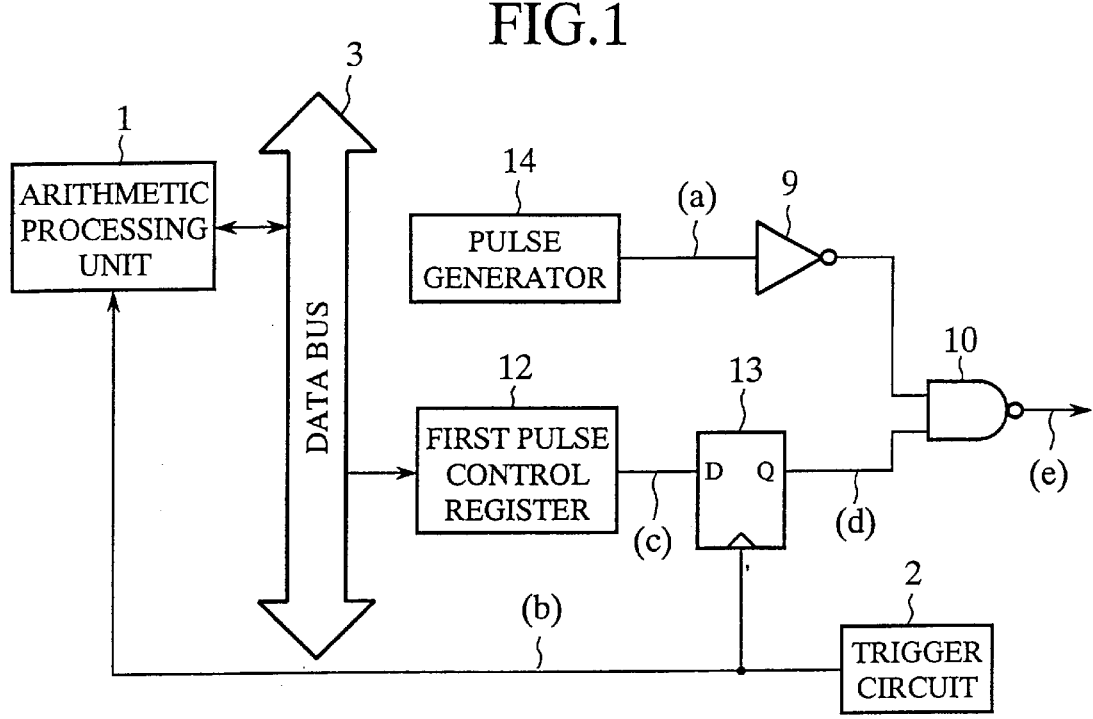
FIG. 1 is a block diagram showing a configuration of a microcomputer capable of outputting pulses as a first embodiment of the present invention.

FIG. 1 is a block diagram showing a configuration of a microcomputer capable of outputting pulses as a first embodiment of the present invention. In FIG. 1, the reference number 1 designates an arithmetic processing unit for executing predetermined various kinds of processes and interrupt processes according to an interrupt signal when receiving a trigger signal corresponding to the interrupt signal used for an interrupt operation. The reference number 2 denotes a trigger circuit for generating and outputting the trigger signal to the arithmetic processing unit 1 and other sections. The reference number 3 indicates a group of data buses (hereinafter referred to only as "the data bus") for data input/output among the arithmetic processing unit 1 and other devices. The reference number 12 indicates a first pulse control register (as a first output control circuit) for storing a first pulse control data item that is transferred from the arithmetic processing unit 1 in an interrupt processing and for generating and outputting a first control signal corresponding to the received first pulse control data. The reference number 13 designates a data latch circuit (as a first output control circuit) for outputting a first pulse control signal when latching the first control signal transferred from the first pulse control register 12 according to the trigger signal that is also transferred to the arithmetic processing unit 1. The reference number 14 denotes a pulse generation circuit (pulse generator) for generating and continuously outputting a pulse train having a constant pulse width. The reference number 9 designates a first inverter (as a first two-input logical circuit) for inverting the pulse train in level. The reference number 10 indicates a NAND circuit (as a first two-input logical circuit) for receiving the inverted pulse train from the inverter and the first pulse control signal transferred from the latch circuit 13 and for performing inverted AND operation (or inverted logical sum operation) between them and for outputting an inverted logical sum as the first logical arithmetic signal to outside.

Next, a description will now be given of the operation of the microcomputer capable of outputting pulses as the first embodiment shown in FIG. 1.

FIG. 2 is a timing chart showing the operation of the microcomputer capable of outputting pulses shown in FIG. 1. In the timing chart shown in FIG. 2, the reference characters (a) to (e) correspond to signal levels on nodes (a) to (e) in the microcomputer shown in FIG. 1, respectively.

As shown in FIG. 2, in an initial state of the microcomputer of the first embodiment, the level of the first pulse control signal from the first data latch circuit 13 is a low level and the first pulse control register 12 received and stored data "1", so that the first pulse control register 12 outputs the first control signal of a high level (see (a) in FIG. 2). Accordingly, the first logical arithmetic signal from the NAND circuit 10 is the low level even if the NAND circuit 10 receives the pulse train (see (a) in FIG. 2) from the pulse generator 14 through the inverter 9. This state causes that the microcomputer outputs no pulse (see (e) in FIG. 2).

In this state, the first trigger signal is transferred from the trigger circuit 2 to both the arithmetic processing unit 1 and the first data latch circuit 13 (see (b) in FIG. 2). According to the transmission of the first trigger signal, the data latch circuit 13 latches the first control signal and outputs the first pulse control signal of the high level (see (d) in FIG. 2). Then, the NAND circuit 10 outputs a pulse train (see (e) in FIG. 2) that is changed in phase in synchronization with the pulse train output from the pulse generator 14 (see (a) in FIG. 2). Thereby, the microcomputer outputs the pulse train.

At the same time, the arithmetic processing unit 100 perform an interrupt operation according to the first trigger signal and writes a new data item as the first pulse control data into the first pulse control register 12. In the situation that the arithmetic processing unit 1 writes a data item "0" as the first pulse control data into the first pulse control register 12, the first pulse control signal output from the first data latch circuit 13 is switched to the low level (see (d) in FIG. 2) when the trigger circuit 2 outputs a second trigger signal. As a result, the NAND circuit 10 outputs no pulse (see (e) in FIG. 2).

In addition, in a case that the arithmetic processing unit 1 writes a data item "1" as the first pulse control data into the first pulse control register 12, the first data latch circuit 13 keeps to output the first pulse control data of the high level (see (d) in FIG. 2) even if the trigger circuit 2 outputs the second trigger signal. As a result, the NAND circuit 10 outputs a pulse train continuously (see (e) in FIG. 2).

As described above, according to the microprocessor capable of outputting pulses as the first embodiment, the first data latch circuit 13 to latch data by receiving the trigger signal is placed between the first pulse control register 12 and the NAND circuit 10. It is thereby possible to switch the output pulses from the NAND circuit 10 in a stable timing immediately following the receiving of the trigger signal and it is thereby possible to perform the pulse output operation in real time.

Furthermore, because the arithmetic processing unit 1 may perform the data write operation to the first pulse control register 12 according to a preceding trigger signal that has already been received, it is not required to write the first pulse control data to the first pulse control register 12 immediately following the receiving of the trigger signal from the trigger circuit 2. Accordingly, it is not required to occupy the arithmetic processing unit 1 during the pulse output operation and to increase the priority of the interrupt level of the trigger signal. This causes to decrease the load of the arithmetic processing unit 1 when comparing with the conventional one.

Second Embodiment

Figure 3:
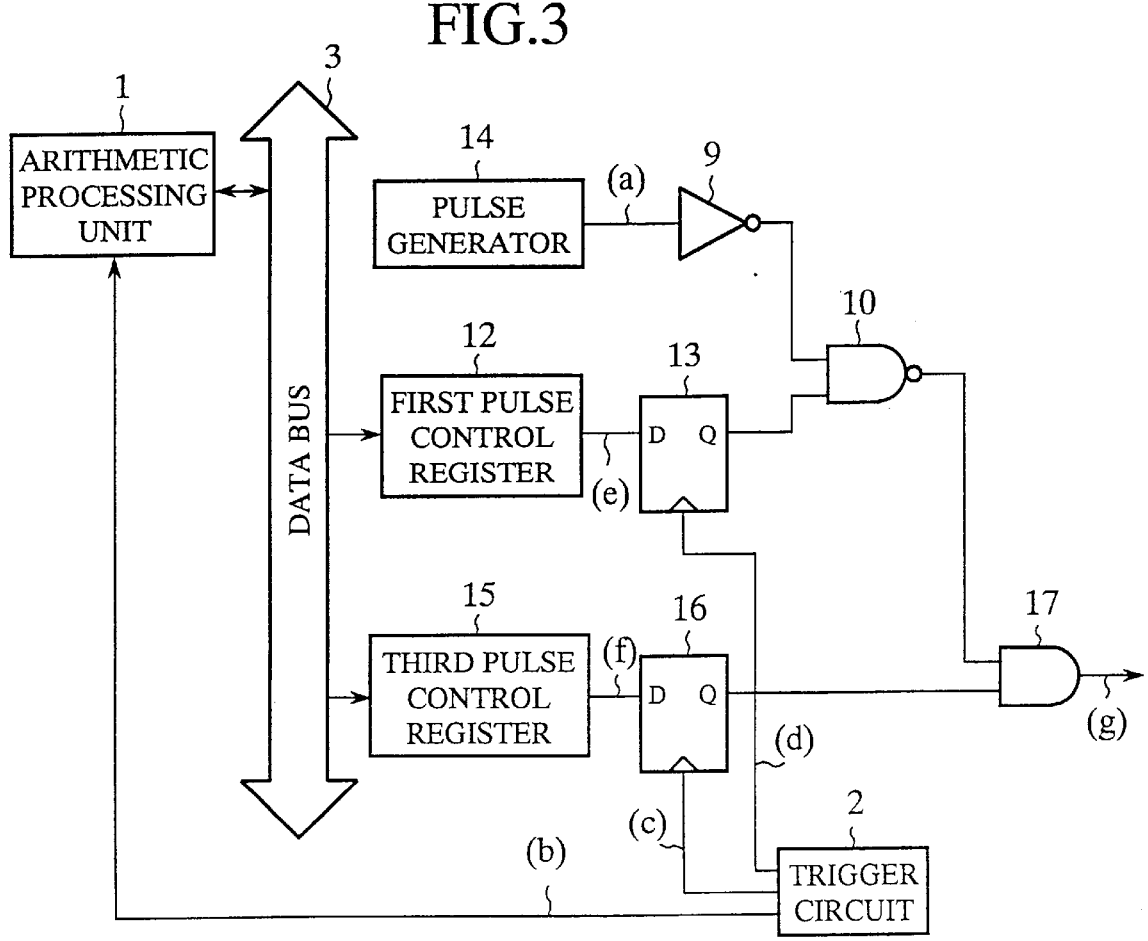
FIGS. 3 is a block diagram showing a configuration of a microcomputer capable of outputting pulses as a second embodiment of the present invention.

FIG. 3 is a block diagram showing a configuration of a microcomputer capable of outputting pulses as the second embodiment of the present invention. In FIG. 3, the reference number 15 designates a third pulse control register (as a third output control circuit) for receiving a third pulse control data transferred from the arithmetic processing unit 1, and storing it, and outputting a third control signal corresponding to the third pulse control data. The reference number 16 indicates a third data latch circuit (as a third output control circuit) for latching the third pulse control signal transferred from the third pulse control register 15 according to receiving of the trigger signal transferred from the trigger circuit 2, that is also transferred to the arithmetic processing unit 1, and for outputting a third pulse control signal. The reference number 17 denotes a AND circuit (as a second two-input logical circuit) for receiving both the first logical arithmetic signal transferred from the NAND circuit 10 and the third pulse control signal from the third data latch circuit 16 and for outputting a result of the arithmetic operation between them as a second logical arithmetic signal to outside. The microcomputer outputs the second logical arithmetic signal as output pulse. Other components in the microcomputer of the second embodiment are the same as those of the microcomputer of the first embodiment. Therefore the same components are referred by using the same reference numbers and the explanation of the same components is omitted for brevity.

Next, a description will now be given of the operation of the microcomputer capable of outputting pulses as the second embodiment shown in FIG. 3.

FIG. 4 is a timing chart showing the operation of the microcomputer capable of outputting pulses shown in FIG. 3. In the timing chart shown in FIG. 4, the reference characters (a) to (g) correspond to signal levels on nodes (a) to (g) in the microcomputer shown in FIG. 3, respectively.

In an initial state of the microcomputer, the level of the third pulse control signal as output from the third data latch circuit 16 is the low level. When the data item "1" is written into both the first pulse control register 12 and the third pulse control register, both the first data latch circuit 12 and the third data latch circuit 15 keep to output the first pulse control signal of the high level and the third pulse control signal of the high level, respectively.

Accordingly, the NAND circuit 10 outputs the second logical arithmetic signal of the low level, so that the microcomputer outputs no pulse (see Timing T41 of (g) in FIG. 4) even if the pulse generator 14 outputs the pulse train continuously (see (a) in FIG. 4).

Under this situation, the trigger circuit 2 outputs the first trigger signal to both the arithmetic processing unit 1 and the first data latch circuit 13 and the third data latch circuit 16 simultaneously (see (b), (c), and (d) in FIG. 4). According to the receiving of the trigger signal, both the first and third data latch circuits 13 and 16 latch the first pulse control signal and the third pulse control signal, and output the signal of the high level respectively. Thereby, the AND circuit 17 outputs the pulse train that is the same of the pulse train from the pulse generator in phase (see (g) in FIG. 4). The microcomputer outputs the pulse train continuously. At the same time, the arithmetic processing unit 1 perform the interrupt process according to the first trigger signal to write a new data item to both the first and third pulse control registers 12 and 15.

In the data writing process by the arithmetic processing unit 1 based on the receiving of the first trigger signal, the arithmetic processing unit 1 writes the data item "0" to both the first pulse control register 13 and the third pulse control register 15, the level of the output from each of the first data latch circuit 13 and the third data latch circuit 16 becomes the low level when receiving the second trigger signal transferred from the trigger circuit 2. As a result, the AND circuit 17 outputs no pulse (see Timing T42 in FIG. 4).

On the other hand, the arithmetic processing unit 1 writes the data item "1" to both the first and third pulse control registers 13 and 15, the level of the output from each of the first and third data latch circuits 13 and 16 becomes the high level when receiving the second trigger signal transferred from the trigger circuit 2. As a result, the AND circuit 17 outputs the pulse train continuously.

Furthermore, in the situation in which the microcomputer outputs no pulse, the arithmetic processing unit 1 writes the data item "0" to the first pulse control register 13 and the data item "1" to the third pulse control register 15, the level of the output from the NAND circuit 10 keeps to output the first logical arithmetic signal of the high level. Because the AND circuit 17 receives the third pulse control signal of the high level, the AND circuit 17 outputs a pulse continuously. Accordingly, the AND circuit 17 outputs the pulse having a longer pulse width until a following trigger signal will be received by the data latch circuits 13 and 16.

As described above, according to the microprocessor capable of outputting pulses as the second embodiment, the first data latch circuit 13 for latching data by receiving of the trigger signal is placed between the first pulse control register 12 and the NAND circuit 17, and the third data latch circuit 16 for latching data by receiving of the trigger signal is placed between the third pulse control register 15 and the NAND circuit 17. It is thereby possible to perform the pulse output operation in real time, like the microcomputer capable of outputting pulses of the first embodiment shown in FIG. 1. In addition to this effect, it is possible to output pulses having two kinds of waveforms from the AND circuit 17 by the combination of the data to be written into both the first and third pulse control registers 12 and 15.

Furthermore, when it is controlled so that those pulses having two kinds of waveforms are output continuously through the AND circuit 17 in the microcomputer, it is possible to use the microcomputer of the second embodiment as a motor control device capable of generating and outputting waveforms in order to reduce the electrical power consumption of the motor.

In addition, because the arithmetic processing unit 1 may perform the data write operation to the first pulse control register 12 and the third pulse control register 15 according to the receiving of a preceding trigger signal, it is not required to write the first and the third pulse control data items to the first and third pulse control registers 12 and 15 immediately following the receiving of the trigger signal from the trigger circuit 2. Accordingly, it is not required to occupy the arithmetic processing unit 1 during the pulse output operation and to increase the priority of the interrupt level of the trigger signal. This causes to decrease the load of the arithmetic processing unit 1 when comparing with the conventional one.

Furthermore, because the output of the pulse generator 14 is inverted by the inverter 9 and then output from the NAND circuit 10, and because the NAND circuit 10 and the And circuit 17 are combined in configuration, it is possible to match the first rising edges of both the pulses having the two kinds of waveforms according to the receiving of a trigger signal. It is thereby easily achieved to construct control systems using the pulses having the two kinds of waveforms.

Third Embodiment

The microcomputer capable of outputting pulses as the third embodiment of the present invention comprises the same components in the microcomputer of the second embodiment shown in FIG. 3. Therefore those components are referred by using the same reference numbers and the explanation of the same components is omitted for brevity.

Next, a description will now be given of the operation of the microcomputer capable of outputting pulses as the third embodiment.

FIG. 5 is a timing chart showing the operation of the microcomputer capable of outputting pulses of the third embodiment of the present invention. In the timing chart shown in FIG. 5, the reference characters (a) to (g) correspond to signal levels on nodes (a) to (g) in the microcomputer shown in FIG. 3, respectively.

In an initial state of the microcomputer, the third data latch circuit 15 outputs the third pulse control signal of the high level and the first data latch circuit 13 outputs the first pulse control signal of the high level. In addition, the data item "0" is written into the first pulse register 12 and the data item "1" is written into the third pulse control register 15. Thereby, the AND circuit 17 outputs the pulse train continuously that is equal to the pulse strain transferred from the pulse generator 14. In this situation, when the trigger circuit generates and transfers the trigger signal to both the first data latch circuit 13 and the arithmetic processing unit 1 simultaneously. Thereby, the first data latch circuit 13 latches the first pulse control signal transferred from the first pulse control register 12 and outputs the data of the low level as the first pulse control signal. As a result, the AND circuit 17 outputs the data of the high level constantly. At the same time, the arithmetic processing unit 1 performs the interrupt operation according to the receiving of the trigger signal from the trigger circuit 2 and then output a new data item only to the first pulse control register 12.

When a second trigger signal is transferred to both the first data latch circuit 13 and the arithmetic processing unit 1, the first data latch circuit 13 outputs the data of the high level and the AND circuit 17 outputs again the pulse train corresponding to the pulse train transferred from the pulse generator 14.

As described above, according to the microprocessor capable of outputting pulses as the third embodiment, because the first data latch circuit 13 receives trigger signals whose number is greater by at least one than the number of trigger signals received by the third data latch circuit 16, it is not required to replace the data items stored in all of the data latch circuits by the arithmetic processing unit 1 every receiving of the trigger signal from the trigger circuit 2. Thereby it is possible to reduce the load of the arithmetic processing unit 1 and the pulse generator 14 and it is possible to output pulse trains having many kinds of waveforms continuously.

Fourth Embodiment

Figure 6:
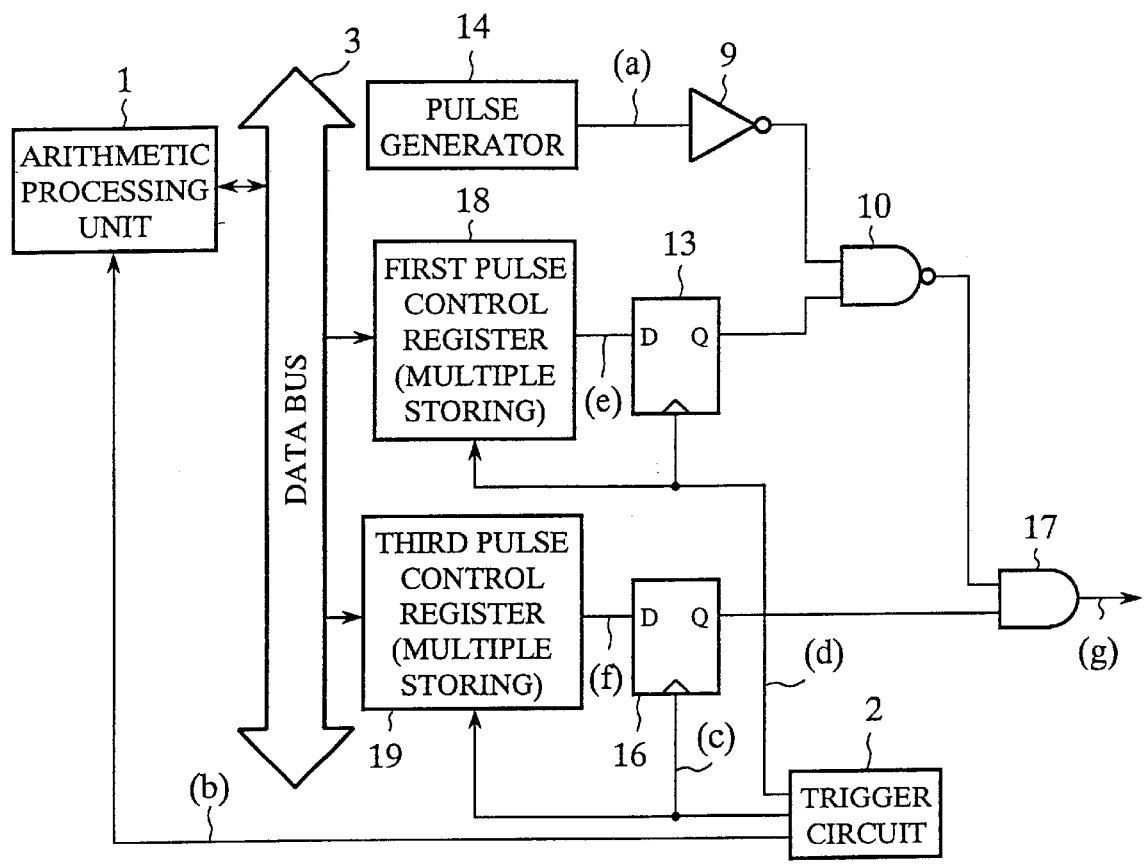
FIG. 6 is a block diagram showing a configuration of a microcomputer capable of outputting pulses as a fourth embodiment of the present invention.

FIG. 6 is a block diagram showing a configuration of a microcomputer capable of outputting pulses as the fourth embodiment of the present invention. In FIG. 6, the reference number 18 designates a first pulse control register including a plurality of registers (a multiple storing configuration) for receiving and storing first pulse control data items per interrupt operation executed by the arithmetic processing unit 1 and for outputting first pulse control signals corresponding to the stored first pulse control data items according to the receiving of the trigger signal from the trigger circuit 2. The reference number 19 denotes a third pulse control register including a plurality of registers (a multiple storing configuration) for receiving and storing third pulse control data items per interrupt operation executed by the arithmetic processing unit 1 and for outputting third pulse control signals corresponding to the stored third pulse control data items according to the receiving of the trigger signal from the trigger circuit 2. Other components in the microcomputer of the fourth embodiment are the same as those of the microcomputer of the second embodiment shown in FIG. 3. Therefore the same components are referred by using the same reference numbers and the explanation of the same components is omitted for brevity.

Next, a description will now be given of the operation of the microcomputer capable of outputting pulses as the fourth embodiment shown in FIG. 6.

FIG. 7 is a timing chart showing the operation of the microcomputer capable of outputting pulses shown in FIG. 6. In the timing chart shown in FIG. 6, the reference characters (a) to (g) correspond to signal levels on nodes (a) to (g) in the microcomputer shown in FIG. 6, respectively.

Firstly, the trigger circuit 2 outputs a trigger signal to the arithmetic processing unit 1 and then the arithmetic processing unit 1 writes a plurality of pulse control data items to both the first pulse control register 18 and the third pulse control register 19, respectively.

Next, the trigger circuit 2 outputs a trigger signal to both the first pulse control register 18 and the first data latch circuit 13. Thereby, the first data latch circuit 13 switches the output thereof corresponding to the first pulse control signal from the first pulse control register 18. At the same time, the first pulse control register 18 switches the output thereof corresponding to the following first pulse control data stored in the first pulse control register 18 itself (see (e) in FIG. 7).

In addition, like the first pulse control register 18 and the first data latch circuit 13, the third pulse control register 19 and the third data latch circuit 16 may switch those outputs, respectively, according to receiving a trigger signal transferred from the trigger circuit 2.

As described above, according to the microprocessor capable of outputting pulses as the fourth embodiment, it is possible to output pulses having two kinds of waveforms by outputting a trigger signal only to both the first pulse control register 18 and the first data latch circuit 13 under the condition in which the first pulse control register 18 stores a plurality of the first pulse control data items. Furthermore, the pulse output operation of the microcomputer of the fourth embodiment does not wait the data write operation performed by the arithmetic processing unit 1, so that it is possible to switch the waveform of the output pulse from the microcomputer at a high speed rate when comparing with the conventional microprocessor. On the contrary, while the AND circuit 17 outputs the pulse whose waveform has already been set, the arithmetic processing unit 1 does not perform the data write operation to the first and third pulse control registers 18 and 19. This causes to reduce the load of the arithmetic processing unit 1.

Fifth Embodiment

Figure 8:
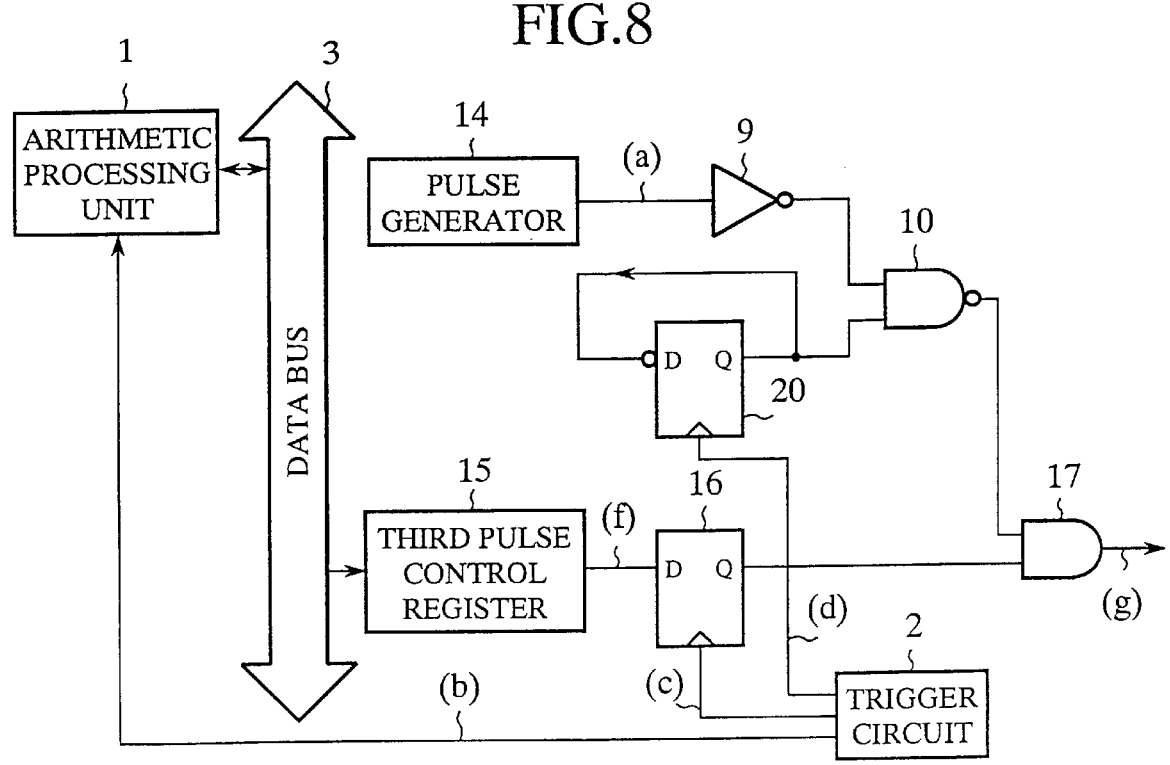
FIG. 8 is a block diagram showing a configuration of a microcomputer capable of outputting pulses as a fifth embodiment of the present invention.

FIG. 8 is a block diagram showing a configuration of the microcomputer capable of outputting pulses as the fifth embodiment of the present invention. In FIG. 8, the reference number 20 designates a first toggle circuit (as a first output control circuit) for switching the output thereof from the high level/low level to the low level/high level corresponding to the receiving of the trigger signal transferred from the trigger circuit 2. Other components in the microcomputer of the fifth embodiment are the same as those of the microcomputer of the second embodiment shown in FIG. 3. Therefore the same components will be referred by using the same reference numbers and the explanation of the same components is omitted for brevity.

Next, a description will now be given of the operation of the microcomputer capable of outputting pulses as the fifth embodiment shown in FIG. 8.

FIG. 9 is a timing chart showing the operation of the microcomputer capable of outputting pulses shown in FIG. 8. In the timing chart shown in FIG. 9, the reference characters (a) to (g) correspond to signal levels on nodes (a) to (g) in the microcomputer shown in FIG. 8, respectively.

Firstly, the trigger circuit 2 transfers a trigger signal to the third data latch circuit 16 under the condition that the data item "1" is stored into the third pulse control register 15 (see (g) in FIG. 9). According to this operation, the third data latch circuit 16 outputs the third pulse control signal of the high level. Thereby, the AND circuit 17 outputs pulses (see (g) in FIG. 9). In this situation, when the trigger circuit 2 outputs the trigger signal to the first toggle circuit 20, the level of output from the first toggle circuit is changed in level. Thereby, the waveform of the pulse from the AND circuit 17 is switched (see (g) in FIG. 9).

When the level of the first pulse control signal from the first toggle circuit 20 is switched from the high level to the low level, the output from the AND circuit 17 is switched from the waveform that is changed corresponding to the pulses output from the pulse generator 14 to the waveform having a constant high level. On the contrary, when the level of the first pulse control signal from the first toggle circuit 20 is switched from the low level to the high level, the output from the AND circuit 17 is switched from the waveform having a constant high level to the waveform that is changed corresponding to the pulses output from the pulse generator 14.

Furthermore, the first toggle circuit 20 receives the trigger signal transferred from the trigger circuit 2, the waveform of the output form the AND circuit 17 is switched to the original form. In addition, the AND circuit 17 stops to output the pulse (see (g) in FIG. 9) when the third data latch circuit 16 receives the trigger signal from the trigger circuit 2 (see (c) in FIG. 9) after the arithmetic processing unit 1 writes the data item "1" to the third pulse control register 15 according to the receiving of the trigger signal. Thereby, the microcomputer outputs no pulse.

As described above, according to the microcomputer capable of outputting pulses, the pattern of the output pulse provided by the first output control circuit is limited to a constant pattern. Thereby, it is not required for the arithmetic processing unit 1 to write the data items. This causes to reduce the load of the arithmetic processing unit. In addition, because the first toggle circuit 20 as the first output control circuit may receive the trigger signal before the completion of the data write operation executed by the arithmetic processing unit 1, it is possible to switch the waveform of the output pulse of the microcomputer at a higher speed rate when comparing with the conventional microprocessor.

Sixth Embodiment

Figure 10:
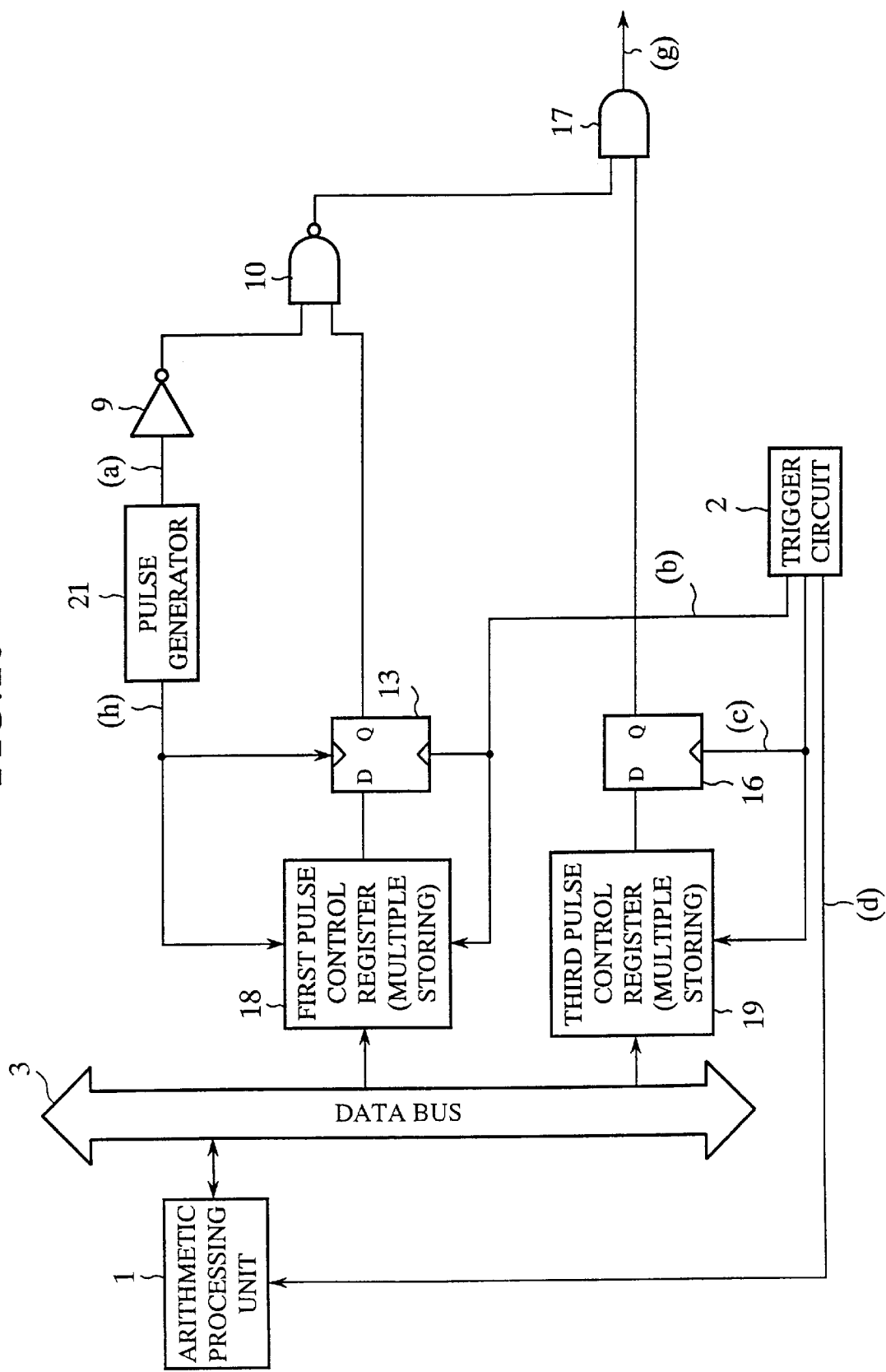
FIG. 10 is a block diagram showing a configuration of a microcomputer capable of outputting pulses as a sixth embodiment of the present invention.

FIG. 10 is a block diagram showing the configuration of a microcomputer capable of outputting pulses as the sixth embodiment of the present invention. In FIG. 10, the reference number 21 designates a pulse generation circuit (or a pulse generator) for generating and outputting an overflow signal every outputting of a pulse. The first pulse register 18 and the first data latch 13 switch the first pulse control signal according to the over flow signal from the pulse generator 21. Other components in the microcomputer of the sixth embodiment are the same as those of the microcomputer of the fourth embodiment shown in FIG. 6. Therefore the same components are referred by using the same reference numbers and the explanation of the same components is omitted for brevity.

Next, a description will now be given of the operation of the microcomputer capable of outputting pulses as the sixth embodiment shown in FIG. 10.

FIG. 11 is a timing chart showing the operation of the microcomputer capable of outputting pulses shown in FIG. 10. In the timing chart shown in FIG. 11, the reference characters (a) to (d), (h) and (g) correspond to signal levels on nodes (a) to (d), (h) and (g) in the microcomputer shown in FIG. 10, respectively.

Firstly, the arithmetic processing unit 1 writes a plurality of pulse control data items into both the first pulse control register 18 and the third pulse control register 19 according to the receiving of the trigger signal from the trigger circuit 2. After this operation of the arithmetic processing unit 1, the trigger circuit 2 outputs a trigger signal to both the data latch circuits 13 and 16 and to both the first and third pulse control registers 18 and 19 (see (b) and (c) in FIG. 11).

According to the receiving of this trigger signal, when the level of the output from the third data latch circuit 16 is switched to the high level, the AND circuit 17 outputs pulses (see (g) in FIG. 11).

As described above, because the pulse generator outputs the over flow signal to the first pulse control register 18 and the first data latch circuit 13 every output of the pulse from the pulse generator 21, the level of the first pulse control signal output from each of the first pulse control register 18 and the first data latch circuit 13 is switched.

As described above, according to the microprocessor of the sixth embodiment, because the level of the first pulse control signal from each of the first pulse control register 118 and the first data latch circuit 13 is switched every outputting of the over flow signal from the pulse generator 21, it is possible to control output pulses from the AND circuit 17 per pulse. In addition, it is possible to reduce the operation speed of the trigger circuit 2 when comparing with the case in which the trigger circuit 2 outputs the pulse in order to control the operation of the first pulse control register 18 and the first data latch circuit 13. Furthermore, it is possible to change data items to be written into the first pulse control register 18 every predetermined step.

Moreover, in the microcomputer of the sixth embodiment, although the pulse generator 21 capable of outputting the over flow signal is incorporated based on the configuration of the fourth embodiment shown in FIG. 6, it is possible to incorporate this pulse generator 21 based on the configuration of the microcomputer of the fifth embodiment shown in FIG. 8. In this case, it is possible to obtain the same effect of the microcomputer of the sixth embodiment. In addition to this effect, it is possible to avoid the data writing operation to the first pulse control register by the arithmetic processing unit. This causes to reduce the load of the arithmetic processing unit.

Seventh Embodiment

Figure 12:
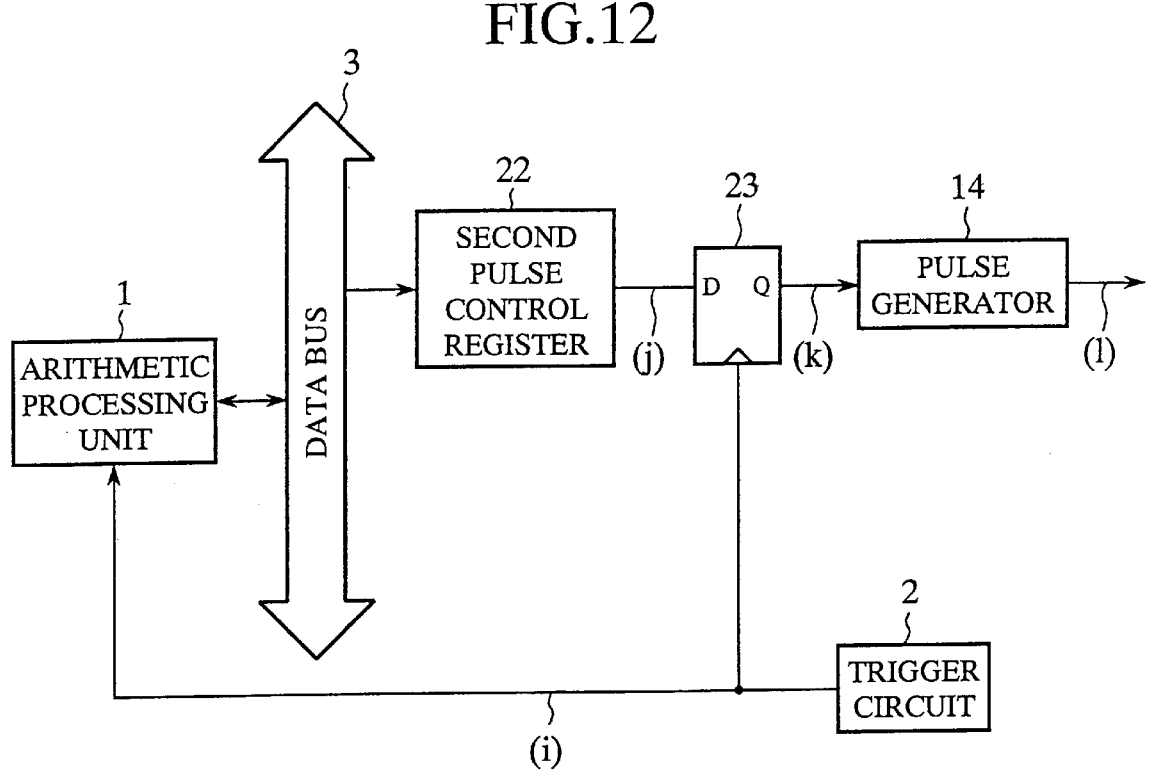
FIG. 12 is a block diagram showing a configuration of a microcomputer capable of outputting pulses as a seventh embodiment of the present invention.

FIG. 12 is a block diagram showing a configuration of the microcomputer capable of outputting pulses as the seventh embodiment of the present invention. In FIG. 12, the reference number 22 designates a second pulse control register (as a second output control circuit) to which a second pulse control data item is written by the arithmetic processing unit 1 and for outputting a second pulse control signal corresponding to the second pulse control data item. The reference number 23 denotes a second data latch circuit (as a second output control circuit) for latching the second pulse control signal from the second pulse control register 22 and for outputting the second pulse control signal when receiving a trigger signal transferred from the trigger circuit 2. The pulse generator 14 operates to output pulses according to the second pulse control signal from the second data latch circuit 23. This output from the pulse generator 14 becomes the output pulse of the microcomputer. Other components in the microcomputer of the seventh embodiment are the same as those of the microcomputer of the first embodiment shown in FIG. 1. Therefore the same components are referred by using the same reference numbers and the explanation of the same components is omitted for brevity.

Next, a description will now be given of the operation of the microcomputer capable of outputting pulses as the seventh embodiment shown in FIG. 12.

FIG. 13 is a timing chart showing the operation of the microcomputer capable of outputting pulses shown in FIG. 12. In the timing chart shown in FIG. 13, the reference characters (i) to (1) correspond to signal levels on nodes (i) to (1) in the microcomputer shown in FIG. 12, respectively.

Firstly, as an initial state of the microcomputer, it is set that the level of the second pulse control signal transferred from the second data latch circuit 23 is the low level (see (k) in FIG. 13) and the data item "1" is written into the second pulse control register so that the level of the second control signal is the high level (see (j) in FIG. 13). Thereby, the operation of the pulse generation circuit 14 halts, namely the pulse generator outputs no pulse (see (1) in FIG. 13).

In this situation, a trigger signal is transferred form the trigger circuit 2 to both the arithmetic processing unit 1 and the second data latch circuit 23 (see Timing T131 in (i) of FIG. 13). Thereby, the second data latch circuit 23 latches the second pulse control signal of the high level from the second pulse control register 22 and provides the output of the high level (see Timing T131 in (k) of FIG. 13). Then, the pulse generator 14 outputs a pulse train (see Timing T131 in (1) of FIG. 12). At the same time, the arithmetic processing unit 1 performs an interrupt operation according to the receiving of the first trigger signal to write a new data item into the second pulse control register 22.

During the data writing operation to the second pulse control register 22 by the arithmetic processing unit 1 according to the receiving of the first trigger signal, when the arithmetic processing unit 1 writes the data item "1" to the second pulse control register 22, the data latch circuit 23 outputs the second pulse control signal of the low level (see Timing T132 in (k) of FIG. 12) when receiving a second trigger signal transferred from the trigger circuit 2. As a result, the pulse generator 14 outputs no pulse (see Timing T132 in (11 of FIG. 12).

In addition, during the data writing operation to the second pulse control register 22 by the arithmetic processing unit 1 according to the receiving of the first trigger signal, when the arithmetic processing unit 1 writes the data item "0" to the second pulse control register 22, the data latch circuit 23 keeps to output the second pulse control signal of the high level even if the trigger circuit 2 transfers a second trigger signal to the data latch circuit 23. As a result, the pulse generator 14 outputs pulses continuously.

As described above, according to the microprocessor of the seventh embodiment, because the output of the second pulse control register 22 that controls the operation of the pulse generator 14 is latched by using the trigger signal that is transferred to the arithmetic processing unit 1. It is thereby possible to switch the output pulse from the pulse generator 14 stability according to the receiving of the trigger signal from the trigger circuit 2. This causes to perform the pulse output operation in real time by the microcomputer.

In addition to this effect, because the arithmetic processing unit 1 may perform the data write operation to the second pulse control register 22 based on a previously received trigger signal, it is not required to execute the data write operation to the second pulse control register immediately following the receiving of the trigger signal. Accordingly, it is not required to occupy the operation of the arithmetic processing unit 1 during the pulse output operation and to increase the priority of the interrupt level of the trigger signal. This causes to decrease the load of the arithmetic processing unit 1 in the microcomputer capable of outputting pulses of the embodiment 7 when comparing with the conventional one.

Eighth Embodiment

Figure 14:
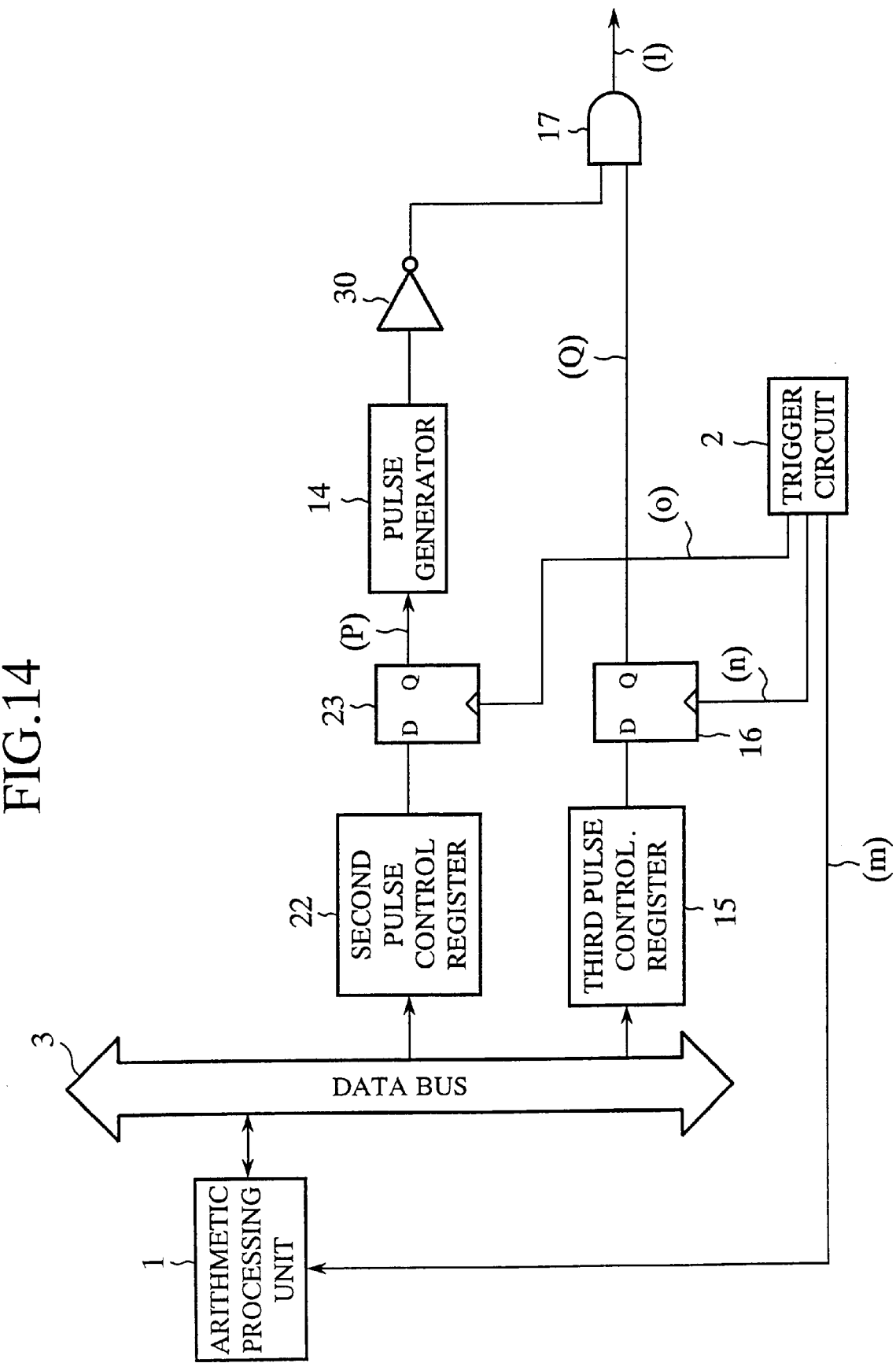
FIG. 14 is a block diagram showing a configuration of a microcomputer capable of outputting pulses as an eighth embodiment of the present invention.

FIG. 14 is a block diagram showing a configuration of the microcomputer capable of outputting pulses as the eighth embodiment of the present invention. In FIG. 14, the reference number 30 designates a second inverter (as a second two-input logical circuit) for inverting the level of the output from the pulse generator 14. Other components in the microcomputer of the eighth embodiment are the same as those of the microcomputer of the seventh embodiment shown in FIG. 12. Therefore the same components are referred by using the same reference numbers and the explanation of the same components is omitted for brevity.

Next, a description will now be given of the operation of the microcomputer capable of outputting pulses as the eighth embodiment shown in FIG. 14.

Figures 15L, 15M, 15N, 15O, 15P, 15Q, 18I, 18L:
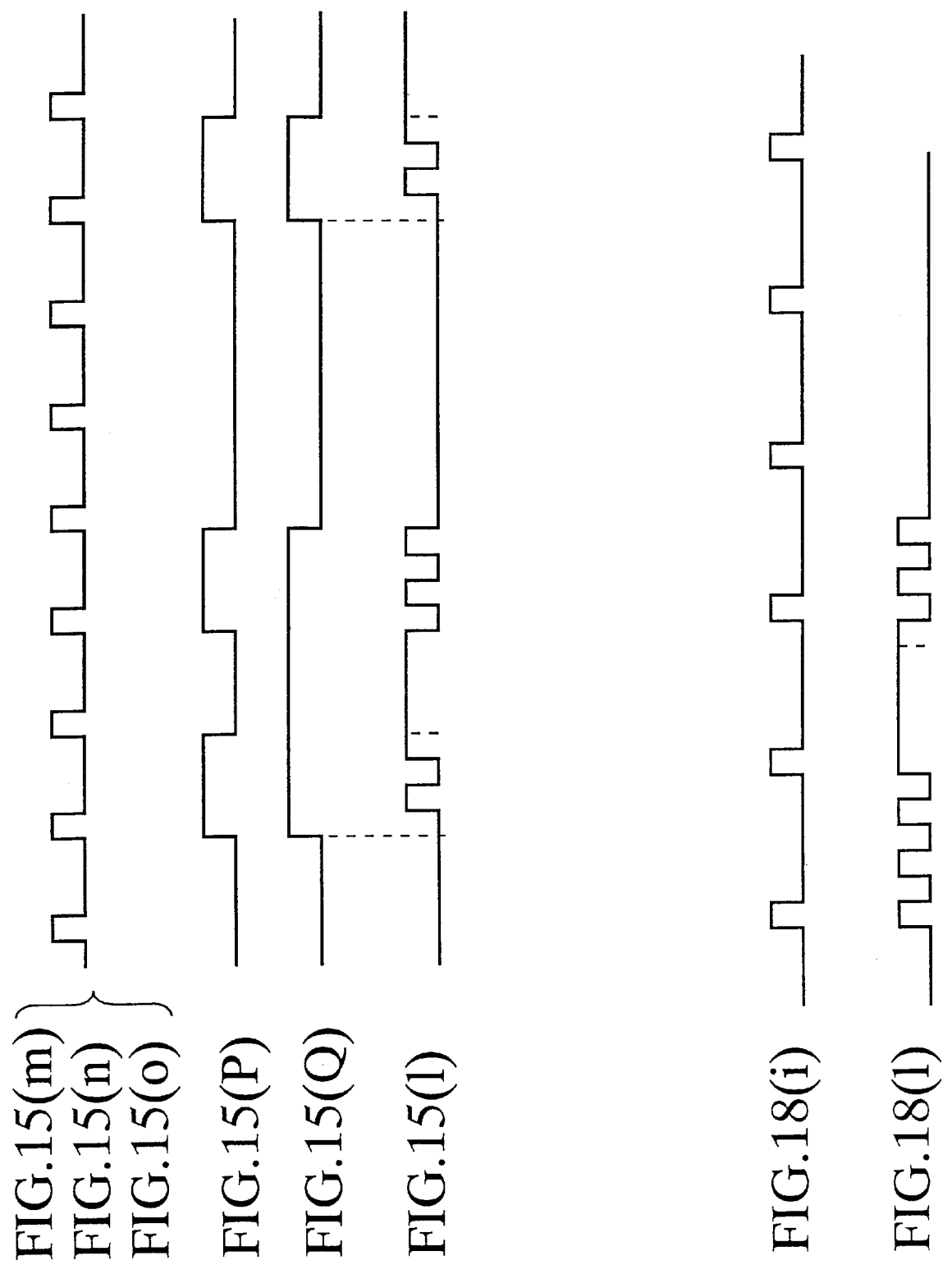

FIG. 15 is a timing chart showing the operation of the microcomputer capable of outputting pulses shown in FIG. 14. In the timing chart shown in FIG. 15, the reference characters (m) to (Q) and (1) correspond to signal levels on nodes (m) to (Q) and (1) in the microcomputer shown in FIG. 14, respectively.

Firstly, in the initial state, the third data latch circuit 16 and the second data latch circuit 23 output the third pulse control signal and the second pulse control signal of the low level, respectively (see (P) and (Q) in FIG. 15), the data item "1" is written into both the third pulse control register 15 and the second pulse control register 22, so that the level of each of the third pulse control signal and the second pulse control signal becomes the high level. Accordingly, the pulse generator 14 outputs no pulse train, and the level of the second logical arithmetic signal that is other input of the AND circuit 17 becomes the low level, so that the AND circuit 17 outputs no output pulse (see (1) in FIG. 15).

In this situation, the trigger circuit 2 transfers a first trigger signal to the arithmetic processing unit 1, the second data latch circuit 23, and the third data latch circuit 16, simultaneously (see (m), (n), and (o) in FIG. 15). According to the receiving of the first trigger signal, the second data latch circuit 23 and the third data latch circuit 16 latch the second pulse control signal and the third pulse control signal, respectively, and each outputs the high level signal (see (P) and (Q) in FIG. 15). The AND circuit 17 outputs a pulse train whose phase is inverted to the pulse train generated by the pulse generator 14 (see (1) in FIG. 14). At the same time, the arithmetic processing unit 1 performs an interrupt process according to the receiving of the first trigger signal to output a new data item to both of the second pulse control registers 22 and 15.

During the data writing operation to the second pulse control register 22 and the third pulse control register 15 by the arithmetic processing unit 1 according to the receiving of the first trigger signal, when the arithmetic processing unit 1 writes the data item "0" to both the second pulse control register 22 and the third pulse control register 15, the second data latch circuit 23 and the third data latch circuit 16 output the second pulse control signal of the low level and the third pulse control signal of the low level (see (P) and (Q) in FIG. 12) when receiving a second trigger signal transferred from the trigger circuit 2. As a result, the AND circuit 17 outputs no pulse (see (1) in FIG. 14).

Specifically, when a second trigger signal is transferred to both the data latch circuits 23 and 16 under the situation in which the arithmetic processing unit 1 writes a data item "1" instead of the data item "0" to both the registers 22 and 16, both the second data latch circuit 23 and the third data latch circuit 16 outputs the signal of the high level (see (P) and (Q) in FIG. 15), so that the AND circuit 17 outputs the pulse train continuously (see (1) in FIG. 15).

In addition, in the situation in which the AND circuit 17 outputs no pulse, when the arithmetic processing unit 1 writes the data item "0" to the second pulse control register 22 and writes the data item "1" to the third pulse control register 15, the AND circuit 17 keeps to output the second logical arithmetic signal of the high level (see (1) in FIG. 14). On the other hand, because the AND circuit 17 receives the third pulse control signal of the high level, the AND circuit 17 outputs the pulse train. Accordingly, the AND circuit 17 outputs the pulse having a pulse width until the receiving of a following trigger signal.

As described above, according to the microprocessor capable of outputting pulses as the sixth embodiment, the second data latch circuit 23 for latching data (namely, the second pulse control signal from the second pulse control register 15) according to the receiving of the trigger signal is incorporated between the second pulse control register 22 and the pulse generator 14, and the third data latch circuit 16 for latching data (namely, the third pulse control signal from the third pulse control register 15) according to the receiving of the trigger signal from the trigger circuit 2 is incorporated between the third pulse control register 15 and the AND circuit 17. Like the microcomputer capable of outputting pulses of the seventh embodiment, it is thereby possible to execute the pulse output operation in real time and to output pulses having two kinds of waveforms from the AND circuit 17 by combination of data items to be written into both the second and third pulse control registers 22 and 15.

Furthermore, when it is controlled so that those pulses having two kinds of waveforms are output continuously through the AND circuit 17 in the microcomputer, it is possible to use the microcomputer of the second embodiment as a motor control device capable of generating and outputting waveforms in order to reduce the electrical power consumption of the motor.

In addition, because the arithmetic processing unit 1 may perform the data write operation to the second pulse control register 22 and the third pulse control register 15 according to the receiving of a preceding trigger signal, it is not required to write the second and the third pulse control data items to the second and third pulse control registers 22 and 15 immediately following the receiving of the trigger signal from the trigger circuit 2. Accordingly, it is not required to occupy the operation of the arithmetic processing unit 1 during the pulse output operation and to increase the priority of the interrupt level of the trigger signal. This causes to decrease the load of the arithmetic processing unit 1, like the microcomputer of the first embodiment, when comparing with the conventional one.

Ninth Embodiment

Figure 16:
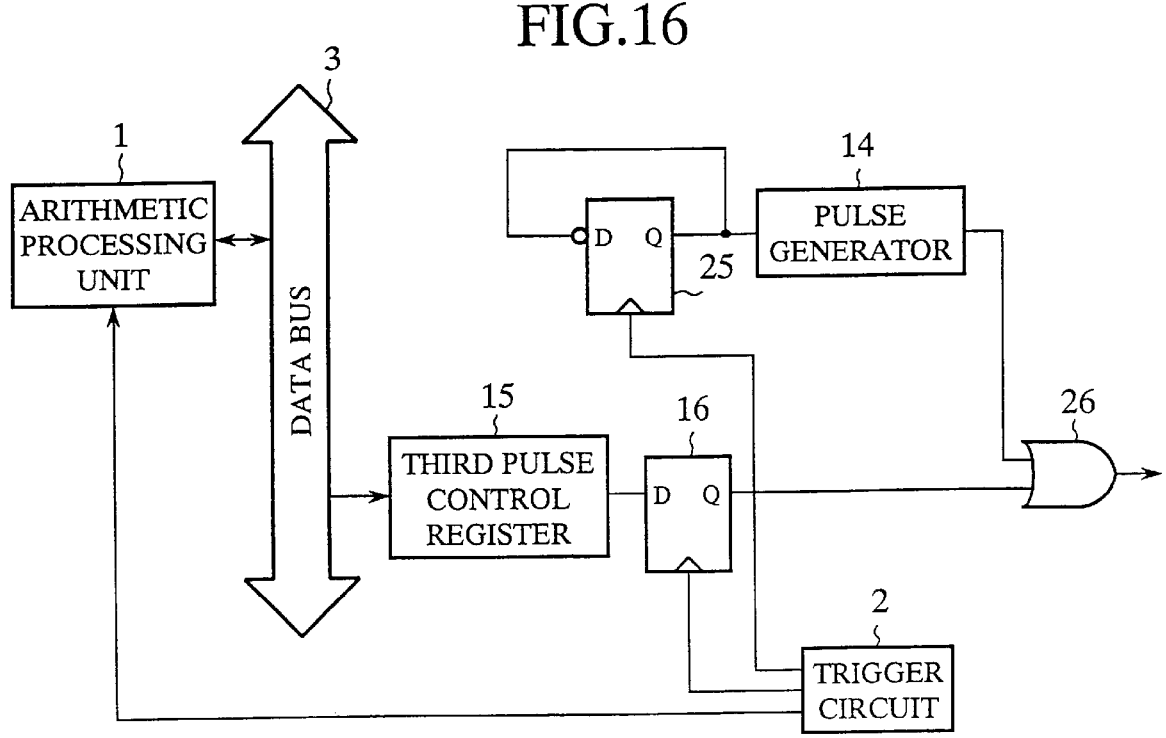
FIG. 16 is a block diagram showing a configuration of microcomputer capable of outputting pulses as a ninth embodiment of the present invention.

FIG. 16 is a block diagram showing a configuration of the microcomputer capable of outputting pulses as the ninth embodiment of the present invention. In FIG. 16, the reference number 15 designates a second toggle circuit (as a second output control circuit) for switching the level of the output thereof, namely from the high/low level to the low/high level, every receiving of the trigger signal transferred from the trigger circuit 2. The reference number 26 designates an OR circuit (as a second two-input logical arithmetic circuit) to which the pulse train from the pulse generator 14 and the third pulse control signal from the third data latch circuit 16 are provided. The OR circuit 26 outputs an output signal of the high level when at least one of the pulse train from the pulse generator 14 and the third pulse control signal from the third data latch circuit 16 is the high level. Other components in the microcomputer of the ninth embodiment are the same as those of the microcomputer of the eighth embodiment shown in FIG. 14. Therefore the same components are referred by using the same reference numbers and the explanation of the same components is omitted for brevity.

Next, a description will now be given of the operation of the microcomputer capable of outputting pulses as the ninth embodiment shown in FIG. 16.

The second toggle circuit 25 switches the output thereof every receiving of the trigger signal transferred from the trigger circuit 2. According to this operation of the toggle circuit 25, the output operation of the pulse generator 14 is controlled, namely halts and restarts to output the pulse train.

For example, the arithmetic processing device 1 writes the data item "1" to the third pulse control register 15 when the second toggle circuit 25 receives the trigger signal from the trigger circuit 2. In this state, because the level of the third pulse control signal becomes the high level when the third data latch circuit 16 receives the trigger signal from the trigger circuit 2, the OR circuit 26 provides the output of a fixed high level.

As described above, the microcomputer capable of outputting pulses of the ninth embodiment has the same function and the same effect of the microcomputer of the eighth embodiment shown in FIG. 14. In addition to this, because the second output control circuit comprises the second toggle circuit 25, it is possible to reduce the load of the arithmetic processing unit 1 and to provide outputs having many kinds of waveforms continuously.

Tenth Embodiment

Figure 17:
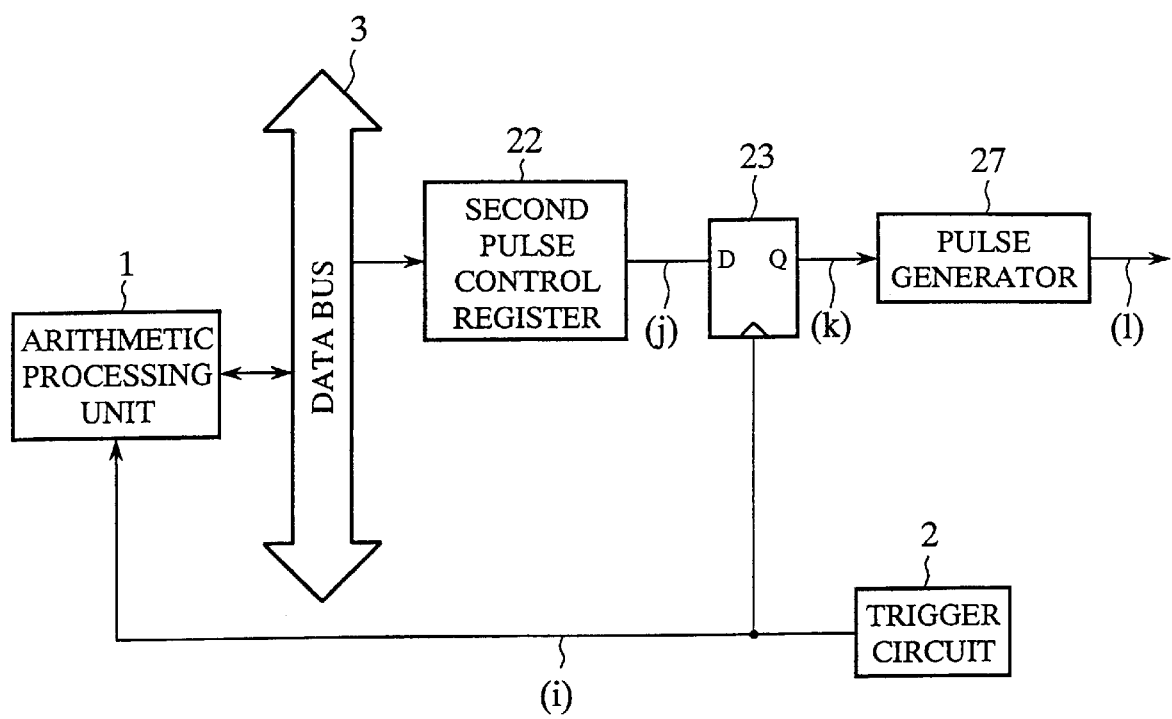
FIG. 17 is a block diagram showing a configuration of microcomputer capable of outputting pulses as a tenth embodiment of the present invention.

FIG. 17 is a block diagram showing a configuration of the microcomputer capable of outputting pulses as a tenth embodiment of the present invention. In FIG. 17, the reference number 27 designates a pulse generation circuit (or a pulse generator) for outputting pulses whose pulse width corresponding to the value stored in the second pulse control register 22 and for outputting an overflow signal every outputting of the pulse. Other components in the microcomputer of the tenth embodiment are the same as those of the microcomputer of the seventh embodiment shown in FIG. 12. Therefore the same components are referred by using the same reference numbers and the explanation of the same components is omitted for brevity.

Next, a description will now be given of the operation of the microcomputer capable of outputting pulses as the seventh embodiment shown in FIG. 17.

FIG. 18 is a timing chart showing the operation of the microcomputer capable of outputting pulses shown in FIG. 17. In the timing chart shown in FIG. 18, the reference characters (i) and (1) correspond to signal levels on nodes (i) and (1) in the microcomputer shown in FIG. 17, respectively.

Firstly, in the initial state, the pulse generator 27 outputs pulses of a pulse width and the second pulse control register 22 stores the data corresponding to the pulse width that is equal to the pulse generation period.

In this situation, the trigger circuit 2 outputs a first trigger signal to both the arithmetic processing unit 1 and the second data latch circuit 23 (see (i) in FIG. 18). According to the receiving of the trigger signal, the second data latch circuit 23 latches the second pulse control signal and to output a pulse of a pulse width that is equal to the generation period of the pulses from the pulse generator 27. At the same time, the arithmetic processing unit 1 performs the interrupt process according to the receiving of the first trigger signal in order to write a new data item to the second pulse control register 22. In this data write operation according to the receiving of the first trigger signal, when the arithmetic processing unit 1 writes the data indicating the pulse width that is equal to the pulse width indicated by data stored in the second pulse control register 22 in the initial state, the second data latch circuit 23 outputs data that was also provided in the initial state when the second data latch circuit 22 receives a second trigger signal from the trigger circuit 2.

In addition, In this data write operation according to the receiving of the first trigger signal, the arithmetic processing unit 1 writes the data indicating that the pulse width of a pulse is zero into the second pulse control register 22, the pulse generator 27 outputs no pulse (see (1) in FIG. 18) when the second data latch circuit 23 receives the second trigger signal from the trigger circuit 2 (see (i) in FIG. 18).

As described above, according to the microcomputer capable of outputting pulses of the tenth embodiment, the pulse generator 27 capable of controlling or changing the pulse width of a pulse to be output is used as a pulse generation circuit, and the second data latch circuit 23 is placed between the second pulse control register 22 and the pulse generator 27. It is thereby possible to switch the output pulse immediately following the receiving of the trigger signal in a stable timing. This causes to perform the pulse output operation in real timing. Furthermore, because the pulse width of a pulse generated by the pulse generator 27 may be changed from zero to the pulse generation period, it is possible to output the pulses having a plurality of waveforms continuously.

In addition, because the arithmetic processing unit 1 may perform the data write operation to the second pulse control register 22 according to the receiving of a preceding trigger signal, it is not required to write the second pulse control data item to the second pulse control register 22 immediately following the receiving of the trigger signal from the trigger circuit 2. Accordingly, it is not required to occupy the arithmetic processing unit 1 during the pulse output operation and to increase the priority of the interrupt level of the trigger signal. This causes to decrease the load of the arithmetic processing unit 1 when comparing with the conventional one.

Eleventh Embodiment

FIG. 19 is a block diagram showing a configuration of the microcomputer capable of outputting pulses as the eleventh embodiment of the present invention. In FIG. 19, the reference number 22 designates a second pulse control register having a function of a countdown capable of counting up or counting down the value of the second pulse control data every a predetermined step according to the receiving of the overflow signal transferred from the pulse generator 27. This overflow signal is also transferred to the second data latch circuit 23. Other components in the microcomputer of the eleventh embodiment are the same as those of the microcomputer of the tenth embodiment shown in FIG. 17. Therefore the same components are referred by using the same reference numbers and the explanation of the same components is omitted for brevity.

Next, a description will now be given of the operation of the microcomputer capable of outputting pulses as the seventh embodiment shown in FIG. 19.

FIG. 20 is a timing chart showing the operation of the microcomputer capable of outputting pulses shown in FIG. 19. In the timing chart shown in FIG. 20, the reference characters (i), (m), and (1) correspond to signal levels on nodes (i), (m), and (1) in the microcomputer shown in FIG. 19, respectively.

Firstly, in the initial state, the pulse generator 27 outputs no pulse, the second pulse control register 22 stores the data item "0". In this situation, the trigger circuit 2 transfers a first trigger signal to both the arithmetic processing unit 1 and the second data latch circuit 23 (see (i) in FIG. 20). According to the receiving of the first trigger signal, the second data latch circuit 23 outputs the second pulse control signal and the pulse generation circuit 27 outputs the pulse having the pulse width corresponding to the second pulse control signal from the second data latch circuit 23.

In addition, the pulse generator 27 outputs the overflow signal every outputting of the pulse (see (m) in FIG. 20). When receiving this overflow signal from the pulse generator 27, the second pulse control register 22 counts up the value of the data stored therein. Furthermore, because this overflow signal is also transferred to the second data latch circuit 23, the second data latch circuit 23 outputs a new second pulse control signal corresponding to the second pulse control signal received from the second pulse control register 22. By repeating the above operations, it is possible to equal the pulse width of the pulse output from the pulse generator 27 to the output period of this second pulse control signal from the second data latch circuit 23 (see (1) in FIG. 20).

In addition, because the countdown of the value stored in the second pulse control register 22 is performed when the second data latch circuit 23 receives the trigger signal form the trigger circuit 2 while the pulse generator 27 outputs the pulses having a pulse width, it is possible to change the pulse width of the output pulse per receiving of the trigger signal.

Although the above description has explained the case in which the data item "0" is stored in the second pulse control register 22, it is possible to start the pulse output operation after the arithmetic processing unit 1 writes a predetermined data item into the second pulse control register 22 by transferring the trigger signal to the arithmetic processing unit 1.

As described above, according to the microcomputer capable of outputting pulses of the eleventh embodiment, because the pulse width of the output pulse is changed according to the receiving of the overflow signal transferred from the pulse generator 27, it is possible to reduce the load of the trigger circuit 2 and the arithmetic processing unit 1 in addition to the effect of the microcomputer capable of outputting pulses as the tenth embodiment shown in FIG. 17. Furthermore, it is possible to execute the changing operation of the waveform of the output pulse without waiting the completion of the data write operation by the arithmetic processing unit 1.

Twelfth Embodiment

Figure 21:
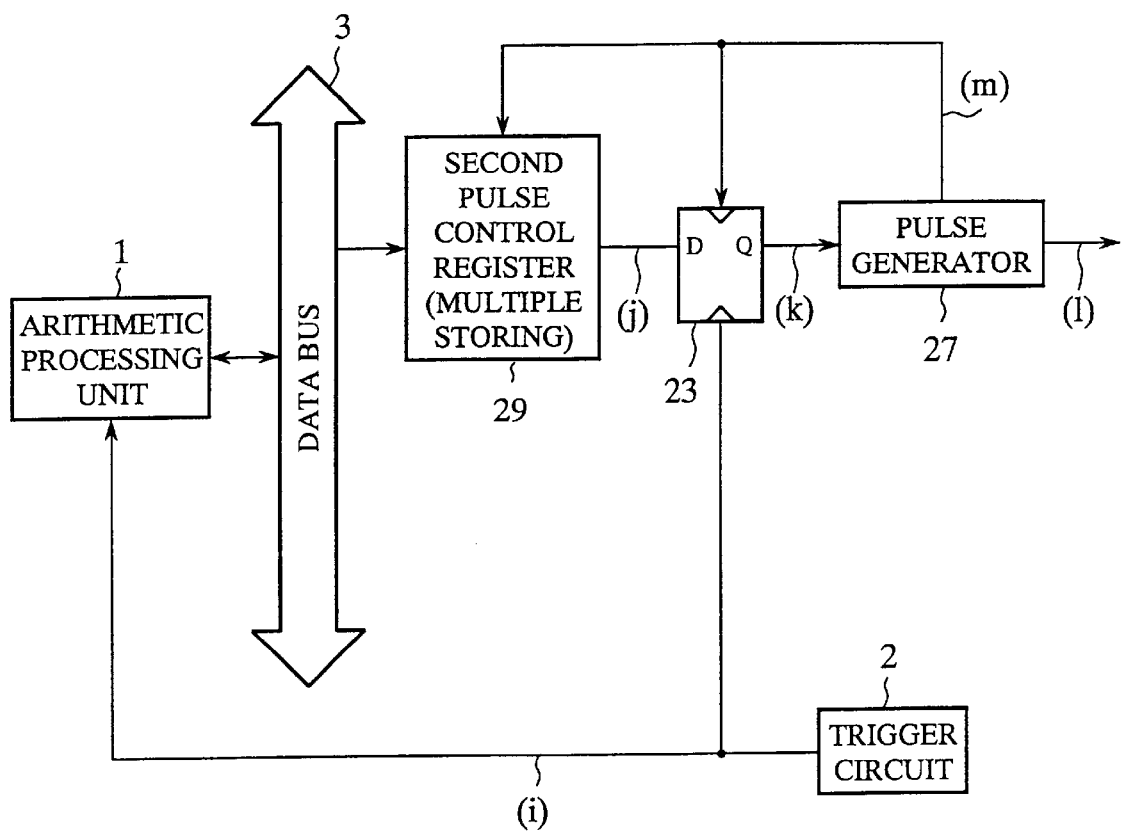
FIG. 21 is a block diagram showing a configuration of a microcomputer capable of outputting pulses as a twelfth embodiment of the present invention.

FIG. 21 is a block diagram showing a configuration of the microcomputer capable of outputting pulses as the twelfth embodiment of the present invention. In FIG. 21, the reference number 29 designates a second pulse control register (having a configuration to store a plurality of data items, namely having a multi-storing configuration) to which a plurality of second pulse control data items are written during one data writing process executed by the arithmetic processing unit 1, and for outputting a second pulse control signal corresponding to the receiving of the trigger signal transferred from the trigger circuit 2. The value of this second pulse control signal is changed sequentially according to each of the second pulse control data items that are written by the arithmetic processing unit 1. Other components in the microcomputer of the twelfth embodiment are the same as those of the microcomputer of the eleventh embodiment shown in FIG. 19. Therefore the same components are referred by using the same reference numbers and the explanation of the same components is omitted for brevity.

Next, a description will now be given of the operation of the microcomputer capable of outputting pulses as the twelfth embodiment shown in FIG. 21.

Figure 22I:
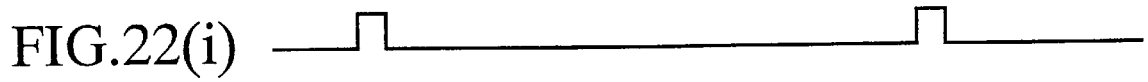
FIGS. 22i and 22l and 22m are a timing chart showing the operation of the microcomputer capable of outputting pulses shown in FIG. 21.
Figure 22M:
Figure 22L:

FIG. 22 is a timing chart showing the operation of the microcomputer capable of outputting pulses shown in FIG. 21. In the timing chart shown in FIG. 22, the reference characters (i), (m), and (1) correspond to signal levels on nodes (i), (m), and (1) in the microcomputer shown in FIG. 21, respectively.

Firstly, in the initial state, the arithmetic processing unit 1 writes a plurality of the second pulse control data items to the second pulse control register 29 corresponding to the receiving of the trigger signal transferred from the trigger circuit 29 (see (i) in FIG. 29). After this writing operation, the trigger circuit 2 outputs the trigger signal to the second data latch circuit 23. When the level of the output from the second data latch circuit 23 is changed to the high level based on the receiving of this trigger signal, the pulse generator 27 outputs pulses (see (1) in FIG. 22).

Because the overflow signal is transferred from the pulse generator 27 to both the second pulse control register 29 and the second data latch circuit 23 (see (m) in FIG. 22) every outputting of the pulse from the pulse generator 27 (see (1) in FIG. 22), it is possible to switch the pulse from the pulse generator 27 corresponding to the the generation period of the pulse, namely the second pulse control signal generated by and transferred from the second data latch circuit 23 (see (m) and (1) in FIG. 22).

As described above, according to the microcomputer capable of outputting pulses, it is possible to control to change the pulse width of the output pulse provided from the pulse generator 27 at optional step in addition to the same effect of the microcomputer capable of outputting pulses of the eleventh embodiment shown in FIG. 19.

Thirteenth Embodiment

Figure 23:
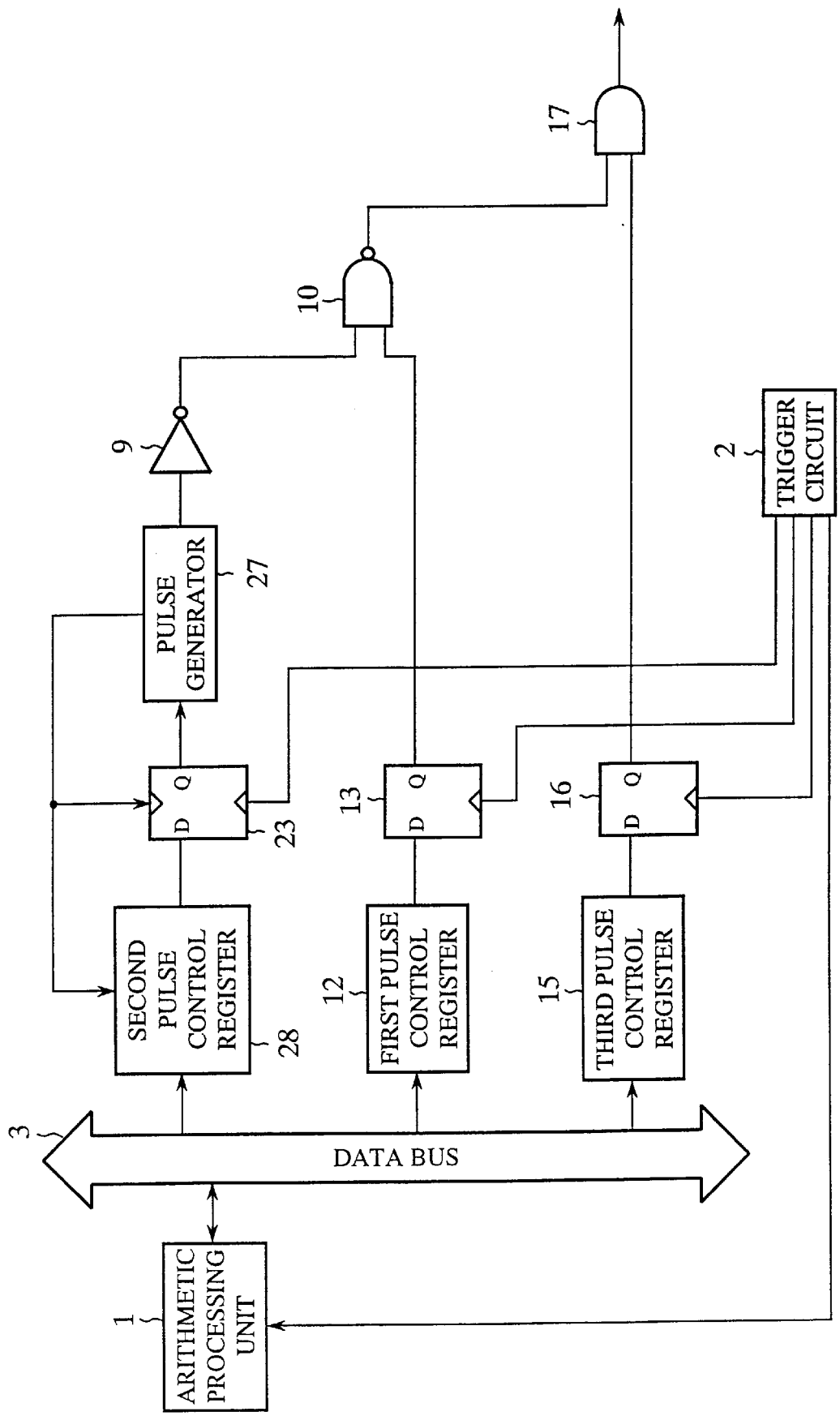
FIG. 23 is a block diagram showing a configuration of a microcomputer capable of outputting pulses as a thirteenth embodiment of the present invention.
Figure 24:
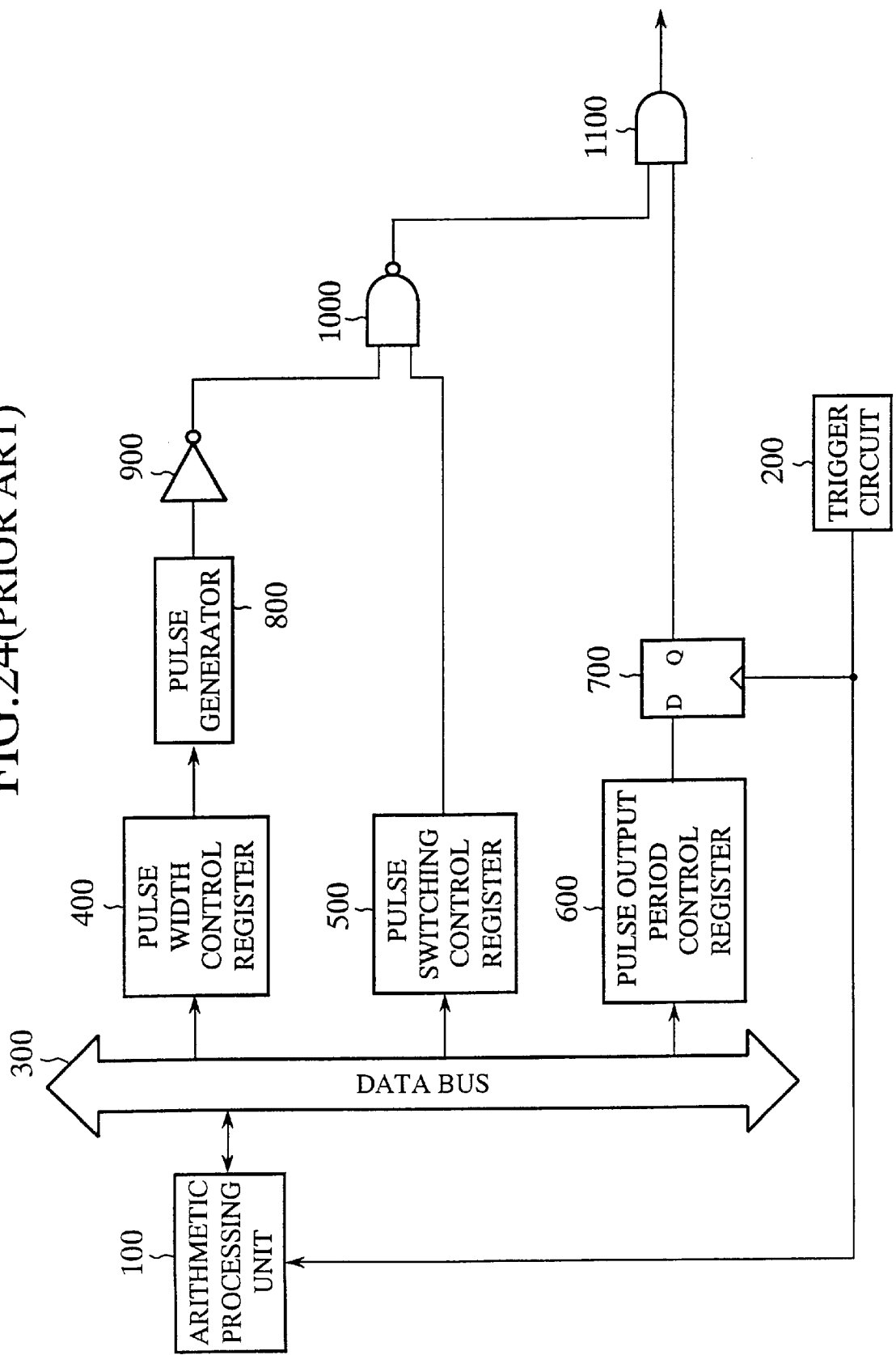
FIG. 24 is a block diagram showing a configuration of a conventional microcomputer capable of outputting pulses.

FIG. 23 is a block diagram showing a configuration of the microcomputer capable of outputting pulses as the thirteenth embodiment of the present invention. In FIG. 23, each component of the microcomputer is the same as each component of the microcomputers disclosed in the first to twelfth embodiments. Therefore the explanation of the components of the microcomputer of the thirteenth embodiment is omitted for brevity.

Next, a description will now be given of the operation of the microcomputer capable of outputting pulses as the thirteenth embodiment shown in FIG. 23.

Firstly, when receiving the trigger signal transferred from the trigger circuit 2, the arithmetic processing unit 1 writes data to each of the first, second, and third pulse control registers 28, 12, and 15. When the arithmetic processing unit 1 writes the data item "1" to the first pulse control register 12 and the third pulse control register 15, and when the first, second, and the third data latch circuits 23, 13, and 16 receive the trigger signal transferred from the trigger circuit 2, the AND circuit 17 outputs the pulse having a pulse width corresponding to the second pulse control signal.

Next, according to the receiving of the overflow signal transferred from the pulse generator 27, the second pulse control signal is counted up. Thereby, the pulse width of the pulse provided by the pulse generator 27 is increased to the pulse width that is equal to the pulse repeating period of the change of the pulse width. Furthermore, before the pulse width of the output pulse is the maximum value, it is possible to transfer a trigger signal to both the arithmetic processing unit 1 and the first data latch circuit 13 and possible to fix the output pulse from the AND circuit 17 to the high level.

Finally, in order to halt the pulse output from the AND circuit 17, the trigger circuit 2 transfers the trigger signal to both the second data latch circuit 23 and the third data latch circuit 16. When the second data latch circuit 23 receives this trigger signal transferred from the trigger circuit 2, the pulse width of the output pulse from the AND circuit 17 is gradually decreased and finally the AND circuit 17 outputs no pulse. When the third data latch circuit 16 receives this trigger signal transferred from the trigger circuit 2, the AND circuit 17 halts to output the pulse immediately.

As described above, according to the microprocessor capable of outputting pulses as the thirteenth embodiment, it is possible to output pulses of various kinds of waveforms by that the arithmetic processing unit 1 performs the data write operation at the start of the end of the pulse output operation.

As set fourth, according to the present invention, the first pulse control register is incorporated in the microcomputer. The arithmetic processing unit writes a first pulse control data to the first pulse control register according to the receiving of the trigger signal transferred from the trigger circuit. In addition to this, the first pulse control signal is transferred to the first two-input logical circuit. It is thereby to switch the first logical arithmetic signal output from the first two-input logical circuit according to the receiving of the trigger signal immediately in a stable timing. On the other hand, the arithmetic processing unit writes the first pulse control data to be used in the timing of the data writing process according to the receiving of a preceding trigger signal that has been received. In other word, it is not required to perform the data write operation immediately following the receiving of the trigger signal. Accordingly, it is possible to reduce the load of the arithmetic processing unit when comparing to the microcomputer capable of outputting pulses, and it is possible to control to output the pulse stability and to perform a real time operation.

Furthermore, according to the present invention, the second pulse control register is incorporated in the microcomputer. The arithmetic processing unit writes a second pulse control data to the second pulse control register according to the receiving of the trigger signal transferred from the trigger circuit. In addition to this, the second pulse control signal is transferred to the pulse generation circuit. It is thereby to switch a pulse train output from the pulse generator in a stable timing immediately following the receiving of the trigger signal. On the other hand, the arithmetic processing unit writes the second pulse control data to be used in the timing of the data writing operation according to the receiving of a preceding trigger signal that has been received. In other word, it is not required to perform the data write operation immediately following the receiving of the trigger signal. Accordingly, it is possible to reduce the load of the arithmetic processing unit when comparing to the microcomputer capable of outputting pulses, and it is possible to control to output the pulse stability and to perform a real time operation.

When both the first and second output control circuits are incorporated in a microcomputer, it is possible to output two or more kinds of pulses by combining pulse control data to be written into each of the output control circuits.

Moreover, when the microcomputer has a configuration in which the third output control circuit for storing the third pulse control data transferred from the arithmetic processing unit and for outputting the third pulse control signal corresponding to the third pulse control data based on the receiving of the trigger signal transferred from the trigger circuit, and the second two-input logical circuit for inputting the first and third pulse control signal and for outputting a result of the arithmetic operation between them as the second logical arithmetic signal are combined, it is possible to output two or more kinds of pulses by using the combination of pulse control data to be inputted to each of the output control circuits. Specifically, when the first two-input logical circuit comprises an inverter circuit to invert a pulse train and a NAND circuit to receive both the output from this inverter and the first pulse control signal and the second two-input logical circuit, it is possible to match a first rising edge of each pulse train after receiving of the trigger signal, so that it is possible to obtain a stable start timing.

In the configuration of the microcomputer capable of outputting pulses according to the present invention described above, for example, in the configuration in which a plurality of output control circuits are incorporated in the microcomputer, there is a possibility to increase the load of the arithmetic processing unit when the number of pulse control data to be written is increased. In this case, for example, a plurality of registers to which the pulse control data items are written is incorporated in at least one of the output control circuits, or a toggle flip flop circuit (a toggle circuit) is incorporated in at least one of the output control circuits in order to avoid the data writing process of the pulse control data. Thereby, the second pulse control signal may be output according to the receiving of the trigger signal instead of the data writing operation for the pulse control data executed by the arithmetic processing unit. It is thereby possible to save the increasing of the load of the arithmetic processing unit.

It is possible to have the configuration in which the pulse input to be provided to each output control circuit is not equal in timing to the trigger signal to be transferred to the arithmetic processing unit, and the pulse generation circuit outputs to a selected one, namely at least one of the first, second, and third output control circuits the trigger signals whose number is greater by at least one than other output control circuits. In this case, it is possible to change only the pulse control signal transferred to the selected one. This causes to reduce the load of the trigger circuit in addition to the arithmetic processing unit and to output a pulse train having many kinds of waveforms continuously.

Furthermore, as described above, it is possible that, for example, an overflow signal is output every outputting the pulse instead of using of the trigger signal transferred from the trigger circuit and a predetermined output pulse control circuit comprises a plurality of registers to which the pulse control data items. In this case, the overflow signal is used as the trigger signal. Moreover, it is acceptable to have a configuration in which the overflow signal is output every outputting the pulse from the pulse generator, and the pulse control data items stored in the predetermined pulse output control circuit are selected by the count-down or count-up operation executed according to the receiving of the overflow signal as the trigger signal. This causes to have the same effect.

In these cases, it is not required to wait the completion of the writing operation for the pulse control data executed by the arithmetic processing unit when the output pulse is switched or changed according to the receiving of the trigger signal. Accordingly, it is possible to perform the operation of the switching period of the waveform of a pulse without considering of the speed of the interrupt operation executed by the arithmetic processing unit. This operation may be performed at a higher speed period than the speed of the interrupt process executed by the arithmetic processing unit. In the former case, there is the effect that the pulse width of a pulse may be changed by an optional step. In the latter case, because it is possible to eliminate the execution of the writing operation of a plurality of pulse control data items by the arithmetic processing unit, it is possible to obtain the effect that the time required for the interrupt operation by the arithmetic processing unit is not increased and it is possible to change gradually the pulse width of the pulse.

Specifically, it is possible to have the same effect even if the polarity of the output pulse is inverted. In addition, it is not required to output a plurality of trigger signals transferred from the trigger circuit simultaneously, or it is also possible to output them simultaneously. Because those cases may have the same effect, the plurality of pulses may be generated and output according to objects.

While the above provides a full and complete disclosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. A microcomputer capable of outputting pulses, comprising:
   an arithmetic processing unit for halts a current process and for executing an interrupt process corresponding to receiving of a trigger signal indicating the interrupt process when said arithmetic processing unit receives the trigger signal for the interrupt process during the execution of the current process;
   a trigger circuit for generating the trigger signal and for outputting the trigger signal to said arithmetic processing unit and other devices;
   a first output control circuit for receiving and storing first pulse control data transferred from the said arithmetic processing unit according to the receiving of the trigger signal, and for outputting a first pulse control signal corresponding to the first pulse control data;
   a pulse generator for generating and for outputting a pulse train; and
   a first two-input logical circuit for inputting the pulse train and the first pulse control signal, and for performing a logical arithmetic operation between them and for outputting a result of the logical arithmetic operation as a first logical arithmetic signal,
   wherein said first output control circuit switches the first pulse control signal to other first pulse control signal according to the receiving of the trigger signal transferred from the trigger signal, and said microcomputer outputs the first logical arithmetic signal as output pulses.

2. A microcomputer capable of outputting pulses, comprising:
   an arithmetic processing unit for halts a current process and for executing an interrupt process corresponding to receiving of a trigger signal indicating the interrupt process when said arithmetic processing unit receives the trigger signal for the interrupt process during the execution of the current process;
   a trigger circuit for generating the trigger signal and for outputting the trigger signal to said arithmetic processing unit and other devices;
   a second output control circuit for receiving and storing second pulse control data transferred from the said arithmetic processing unit according to the receiving of the trigger signal, and for outputting a second pulse control signal corresponding to the second pulse control data; and
   a pulse generator for generating and for outputting a pulse train corresponding to the second pulse control signal,
   wherein said second output control circuit switches the second pulse control signal to other second pulse control signal according to the receiving of the trigger signal transferred from the trigger signal, and said microcomputer outputs the pulse train as output pulses.

3. A microcomputer capable of outputting pulses as claimed in claim 1, further comprises:
   a second output control circuit for receiving and storing second pulse control data transferred from the said arithmetic processing unit according to the receiving of the trigger signal transferred from said trigger circuit, and for outputting a second pulse control signal corresponding to the second pulse control data and for switching the second pulse control signal to other second pulse control signal according to the receiving of the trigger signal transferred from said trigger circuit,
   wherein said pulse generator outputs the pulse train corresponding to the second pulse control signal.

4. A microcomputer capable of outputting pulses as claimed in claim 1, further comprises:
   a third output control circuit for receiving and storing third pulse control data transferred from the said arithmetic processing unit according to the receiving of the trigger signal transferred from said trigger circuit, and for outputting a third pulse control signal corresponding to the third pulse control data and for switching the second pulse control signal to other second pulse control signal according to the receiving of the trigger signal transferred from said trigger circuit; and
   a second two-input logical circuit for inputting the first logical arithmetic signal and the third pulse control signal, and for performing a logical arithmetic operation between them and for outputting a result of the logical arithmetic operation as a second logical arithmetic signal,
   wherein said microcomputer outputs the second logical arithmetic signal as the output pulses.

5. A microcomputer capable of outputting pulses as claimed in claim 2, further comprises:
   a third output control circuit for receiving and storing third pulse control data transferred from the said arithmetic processing unit according to the receiving of the trigger signal transferred from said trigger circuit, and for outputting a third pulse control signal corresponding to the third pulse control data and for switching the second pulse control signal to other second pulse control signal according to the receiving of the trigger signal transferred from said trigger circuit; and
   a second two-input logical circuit for inputting the first logical arithmetic signal and the third pulse control signal, and for performing a logical arithmetic operation between them and for outputting a result of the logical arithmetic operation as a second logical arithmetic signal,
   wherein said microcomputer outputs the second logical arithmetic signal as the output pulses.

6. A microcomputer capable of outputting pulses as claimed in claim 3, further comprises:
   a third output control circuit for receiving and storing third pulse control data transferred from the said arithmetic processing unit according to the receiving of the trigger signal transferred from said trigger circuit, and for outputting a third pulse control signal corresponding to the third pulse control data and for switching the second pulse control signal to other second pulse control signal according to the receiving of the trigger signal transferred from said trigger circuit; and a second two-input logical circuit for inputting the first logical arithmetic signal and the third pulse control signal, and for performing a logical arithmetic operation between them and for outputting a result of the logical arithmetic operation as a second logical arithmetic signal, wherein said microcomputer outputs the second logical arithmetic signal as the output pulses.

7. A microcomputer capable of outputting pulses as claimed in claim 4, wherein said fist two-input logical circuit comprises an inverter circuit for inverting the pulse train and an NAND circuit for inputting the output from said inverter circuit and the first pulse control signal, and wherein said second two-input logical circuit comprises an AND circuit.

8. A microcomputer capable of outputting pulses as claimed in claim 5, wherein said fist two-input logical circuit comprises an inverter circuit for inverting the pulse train and an NAND circuit for inputting the output from said inverter circuit and the first pulse control signal, and wherein said second two-input logical circuit comprises an AND circuit.

9. A microcomputer capable of outputting pulses as claimed in claim 6, wherein said fist two-input logical circuit comprises an inverter circuit for inverting the pulse train and an NAND circuit for inputting the output from said inverter circuit and the first pulse control signal, and wherein said second two-input logical circuit comprises an AND circuit.

10. A microcomputer capable of outputting pulses as claimed in claim 1, wherein at least one of said first output control circuit, said second output control circuit, and said third output control circuit outputs the pulse control signal to other pulse control signal in a constant pattern corresponding to the receiving of the trigger signal instead of receiving and storing the pulse control data transferred from said arithmetic processing unit.

11. A microcomputer capable of outputting pulses as claimed in claim 2, wherein at least one of said first output control circuit, said second output control circuit, and said third output control circuit outputs the pulse control signal to other pulse control signal in a constant pattern corresponding to the receiving of the trigger signal instead of receiving and storing the pulse control data transferred from said arithmetic processing unit.

12. A microcomputer capable of outputting pulses as claimed in claim 3, wherein at least one of said first output control circuit, said second output control circuit, and said third output control circuit outputs the pulse control signal to other pulse control signal in a constant pattern corresponding to the receiving of the trigger signal instead of receiving and storing the pulse control data transferred from said arithmetic processing unit.

13. A microcomputer capable of outputting pulses as claimed in claim 1, wherein said trigger circuit outputs the trigger pulses to at least one of said first output control circuit, said second pulse control circuit, and said third output control circuit, and the number of the trigger pulses is greater by at least one than the trigger pulses that are transferred to others.

14. A microcomputer capable of outputting pulses as claimed in claim 2, wherein said trigger circuit outputs the trigger pulses to at least one of said first output control circuit, said second pulse control circuit, and said third output control circuit, and the number of the trigger pulses is greater by at least one than the trigger pulses that are transferred to others.

15. A microcomputer capable of outputting pulses as claimed in claim 3, wherein said trigger circuit outputs the trigger pulses to at least one of said first output control circuit, said second pulse control circuit, and said third output control circuit, and the number of the trigger pulses is greater by at least one than the trigger pulses that are transferred to others.

16. A microcomputer capable of outputting pulses as claimed in claim 1, wherein said pulse generation circuit outputs an overflow signal every outputting of the pulse, and at least one of said first output control circuit, said second pulse control circuit, and said third output control circuit comprises a plurality of registers for storing the pulse control signals and for sequentially switching the pulse control signal corresponding to the pulse control data when receiving the overflow signal as the trigger signal.

17. A microcomputer capable of outputting pulses as claimed in claim 2, wherein said pulse generation circuit outputs an overflow signal every outputting of the pulse, and at least one of said first output control circuit, said second pulse control circuit, and said third output control circuit comprises a plurality of registers for storing the pulse control signals and for sequentially switching the pulse control signal corresponding to the pulse control data when receiving the overflow signal as the trigger signal.

18. A microcomputer capable of outputting pulses as claimed in claim 3, wherein said pulse generation circuit outputs an overflow signal every outputting of the pulse, and at least one of said first output control circuit, said second pulse control circuit, and said third output control circuit comprises a plurality of registers for storing the pulse control signals and for sequentially switching the pulse control signal corresponding to the pulse control data when receiving the overflow signal as the trigger signal.

19. A microcomputer capable of outputting pulses as claimed in claim 1, wherein said pulse generation circuit outputs an overflow signal every outputting of the pulse, and at least one of said first output control circuit, said second pulse control circuit, and said third output control circuit counts down or counts up the pulse control data in order to sequentially switch the pulse control signal corresponding to the pulse control data when receiving the overflow signal as the trigger signal.

20. A microcomputer capable of outputting pulses as claimed in claim 2, wherein said pulse generation circuit outputs an overflow signal every outputting of the pulse, and at least one of said first output control circuit, said second pulse control circuit, and said third output control circuit counts down or counts up the pulse control data in order to sequentially switch the pulse control signal corresponding to the pulse control data when receiving the overflow signal as the trigger signal.

* * * * *